(12) United States Patent
Frey et al.

(10) Patent No.: US 12,446,947 B2
(45) Date of Patent: Oct. 21, 2025

(54) ELECTROSURGICAL DEVICES, METHODS OF USE, AND METHODS OF MANUFACTURE

(71) Applicant: Stryker European Operations Limited, Cork (IE)

(72) Inventors: Laura Constance Frey, Belfast (IE); Scott McFarland, Greenisland (IE); Paul Sheridan, Wexford (IE); Micheal Burke, Cork (IE); Fernando Erismann, Sacramento, CA (US)

(73) Assignee: Stryker European Operations Limited, Carrigtwohill (IE)

( * ) Notice: Subject to any disclaimer, the term of this patent is extended or adjusted under 35 U.S.C. 154(b) by 412 days.

(21) Appl. No.: 18/044,299

(22) PCT Filed: Sep. 9, 2021

(86) PCT No.: PCT/IB2021/000610
§ 371 (c)(1),
(2) Date: Mar. 7, 2023

(87) PCT Pub. No.: WO2022/053867
PCT Pub. Date: Mar. 17, 2022

(65) Prior Publication Data
US 2023/0320775 A1    Oct. 12, 2023

Related U.S. Application Data

(60) Provisional application No. 63/076,089, filed on Sep. 9, 2020, provisional application No. 63/211,876, filed on Jun. 17, 2021.

(51) Int. Cl.
*A61B 18/14*    (2006.01)
*A61B 18/00*    (2006.01)
(Continued)

(52) U.S. Cl.
CPC .......... *A61B 18/1402* (2013.01); *A61B 18/00* (2013.01); *A61B 90/30* (2016.02);
(Continued)

(58) Field of Classification Search
CPC ................ A61B 18/1402; A61B 90/30; A61B 2218/008
See application file for complete search history.

(56) References Cited

U.S. PATENT DOCUMENTS

2014/0276763 A1    9/2014  Greep et al.
2014/0276770 A1*   9/2014  Ellman .............. A61B 18/1477
                                                     606/34
(Continued)

OTHER PUBLICATIONS

International Search Report mailed on Mar. 21, 2022, issued in connection with International Application No. PCT/IB2021/000610, filed on Sep. 9, 2021, 6 pages.
(Continued)

*Primary Examiner* — Sean W Collins
(74) *Attorney, Agent, or Firm* — McDonnell Boehnen Hulbert & Berghoff LLP

(57) ABSTRACT

In an example, an electrosurgical device includes a housing defining an interior bore, a shaft coupled to the housing, and an electrosurgical electrode coupled to the shaft. The shaft extends distally from the interior bore of the housing. The shaft is rotationally fixed relative to the housing. The shaft includes a smoke evacuation channel extending from a proximal end of the shaft to a distal end of the shaft. A distal portion of the electrosurgical electrode extends distally from the shaft, and wherein the electrosurgical electrode is rotatable relative to the housing and the shaft.

20 Claims, 22 Drawing Sheets

(51) Int. Cl.
   *A61B 90/30*   (2016.01)
   *A61B 17/00*   (2006.01)
(52) U.S. Cl.
   CPC ............... *A61B 2017/00907* (2013.01); *A61B 2017/00991* (2013.01); *A61B 2018/00202* (2013.01); *A61B 2018/00589* (2013.01); *A61B 2018/00607* (2013.01); *A61B 2090/309* (2016.02); *A61B 2218/008* (2013.01)

(56) References Cited

U.S. PATENT DOCUMENTS

| | | | |
|---|---|---|---|
| 2016/0157920 A1* | 6/2016 | Vayser | ............... A61B 18/1402 600/249 |
| 2018/0078301 A1 | 3/2018 | Vayser | |
| 2018/0333201 A1 | 11/2018 | Greep et al. | |
| 2019/0110832 A1* | 4/2019 | Simonsen | .......... A61B 18/1402 |
| 2019/0216539 A1* | 7/2019 | Choi | ................. A61B 18/1402 |
| 2020/0246057 A1* | 8/2020 | Park | ....................... A61B 18/14 |

OTHER PUBLICATIONS

Written Opinion mailed on Mar. 21, 2022, issued in connection with International Application No. PCT/IB2021/000610, filed on Sep. 9, 2021, 9 pages.

\* cited by examiner

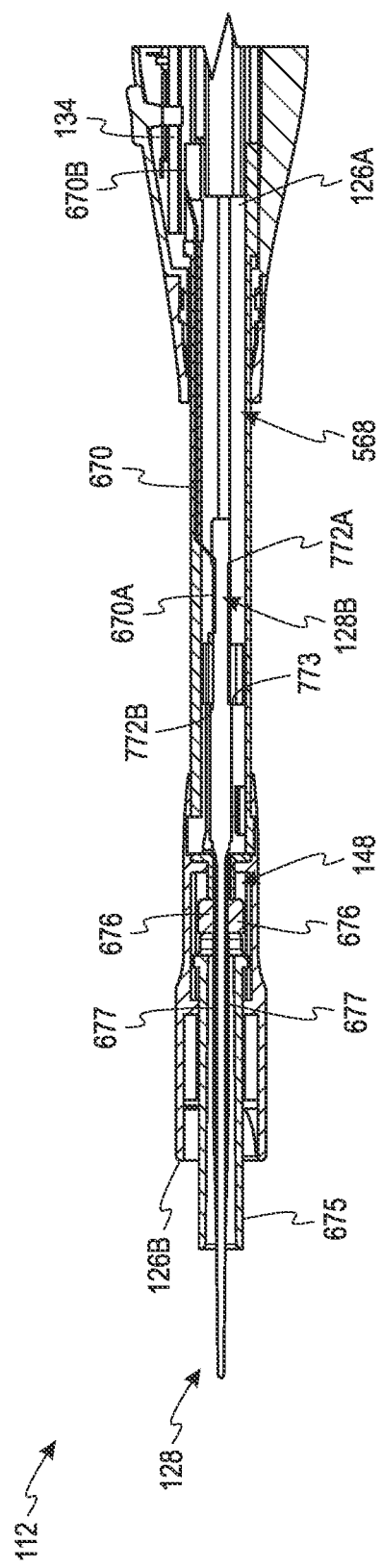
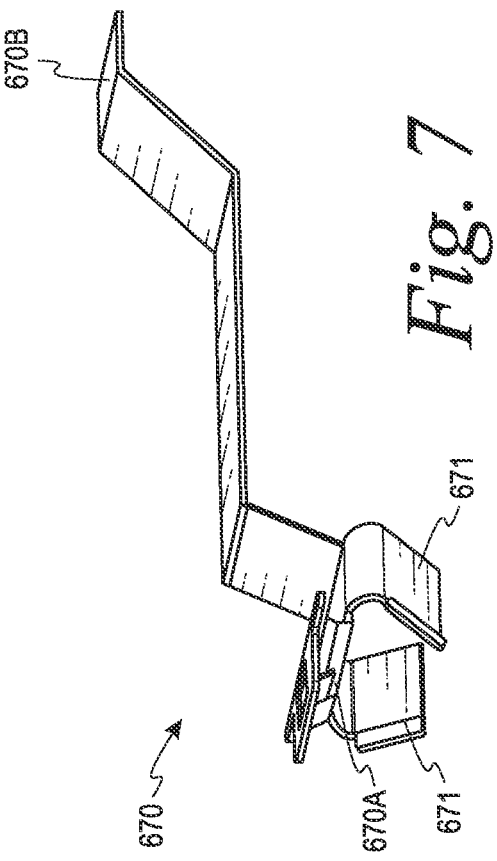
Fig. 6
Fig. 7

ELECTROSURGICAL DEVICES, METHODS OF USE, AND METHODS OF MANUFACTURE

CROSS-REFERENCE TO RELATED APPLICATIONS

This application is the US national phase under 35 U.S.C. § 371 of International Application No. PCT/IB2021/000610, filed Sep. 9, 2021, which claims the benefit of U.S. Provisional Application No. 63/076,089, filed Sep. 9, 2020, and U.S. Provisional Application No. 63/211,876, filed Jun. 17, 2021, the contents of which are hereby incorporated by reference in their entirety.

FIELD

The present disclosure generally relates to methods and apparatus for conveying electrical energy and, more specifically, to electrosurgical devices and the methods providing for rotational adjustment of an electrosurgical electrode.

BACKGROUND

Electrosurgery involves applying a radio frequency (RF) electric current (also referred to as electrosurgical energy) to biological tissue to cut, coagulate, or modify the biological tissue during an electrosurgical procedure. Specifically, an electrosurgical generator generates and provides the electric current to an active electrode, which applies the electric current (and, thus, electrical power) to the tissue. The electric current passes through the tissue and returns to the generator via a return electrode (also referred to as a "dispersive electrode"). As the electric current passes through the tissue, an impedance of the tissue converts a portion of the electric current into thermal energy (e.g., via the principles of resistive heating), which increases a temperature of the tissue and induces modifications to the tissue (e.g., cutting, coagulating, ablating, and/or sealing the tissue).

SUMMARY

In an example, an electrosurgical device is described. The electrosurgical device includes a housing defining an interior bore, a shaft coupled to the housing, and an electrosurgical electrode coupled to the shaft. The shaft extends distally from the interior bore of the housing. The shaft is rotationally fixed relative to the housing. The shaft comprises a smoke evacuation channel extending from a proximal end of the shaft to a distal end of the shaft. A distal portion of the electrosurgical electrode extends distally from the shaft. The electrosurgical electrode is rotatable relative to the housing and the shaft.

In another example, an electrosurgical device is described. The electrosurgical device includes a housing defining an interior bore, a shaft extending distally from the interior bore of the housing. The shaft is rotatable relative to the housing. The shaft has a longitudinal axis extending between a proximal end of the shaft and a distal end of the shaft. The electrosurgical device also includes a smoke evacuation channel in an inner cavity of the shaft. The smoke evacuation channel is rotationally fixed relative to the housing. The electrosurgical device further includes an electrosurgical electrode extending distally from the distal end of the shaft such that (i) the shaft conducts electrosurgical energy to the electrosurgical electrode, and (ii) rotation of the shaft relative to the housing causes corresponding rotation of the electrosurgical electrode relative to the housing.

In another example, a process of operating an electrosurgical device is described. The process includes providing an electrosurgical device. The electrosurgical device includes a housing defining an interior bore, a shaft coupled to the housing, and an electrosurgical electrode coupled to the shaft. The shaft extends distally from the interior bore of the housing. The shaft is rotationally fixed relative to the housing. The shaft includes a smoke evacuation channel extending from a proximal end of the shaft to a distal end of the shaft. A distal portion of the electrosurgical electrode extends distally from the shaft. The electrosurgical electrode is rotatable relative to the housing and the shaft.

The process also includes rotating the electrosurgical electrode relative to the housing and the shaft, and supplying electrosurgical energy to the electrosurgical electrode.

In another example, a process of operating an electrosurgical device is described. The process includes providing an electrosurgical device. The electrosurgical device includes a housing defining an interior bore, a shaft extending distally from the interior bore of the housing, a smoke evacuation channel in an inner cavity of the shaft, and an electrosurgical electrode extending distally from the distal end of the shaft. The shaft is rotatable relative to the housing. The shaft has a longitudinal axis extending between a proximal end of the shaft and a distal end of the shaft. The smoke evacuation channel is rotationally fixed relative to the housing. The electrosurgical electrode is electrically coupled to the shaft.

The process also includes rotating the shaft relative to the housing to cause corresponding rotation of the electrosurgical electrode relative to the housing. The process further includes supplying electrosurgical energy from the shaft to the electrosurgical electrode.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 6 depicts a cross-sectional view of a distal portion of the housing, the shaft, and an electrosurgical electrode for the example implementation shown in FIGS. 4A-4B, according to an example.

FIG. 7 depicts a perspective view of an electrical contact, according to example.

DETAILED DESCRIPTION

Figure 1:
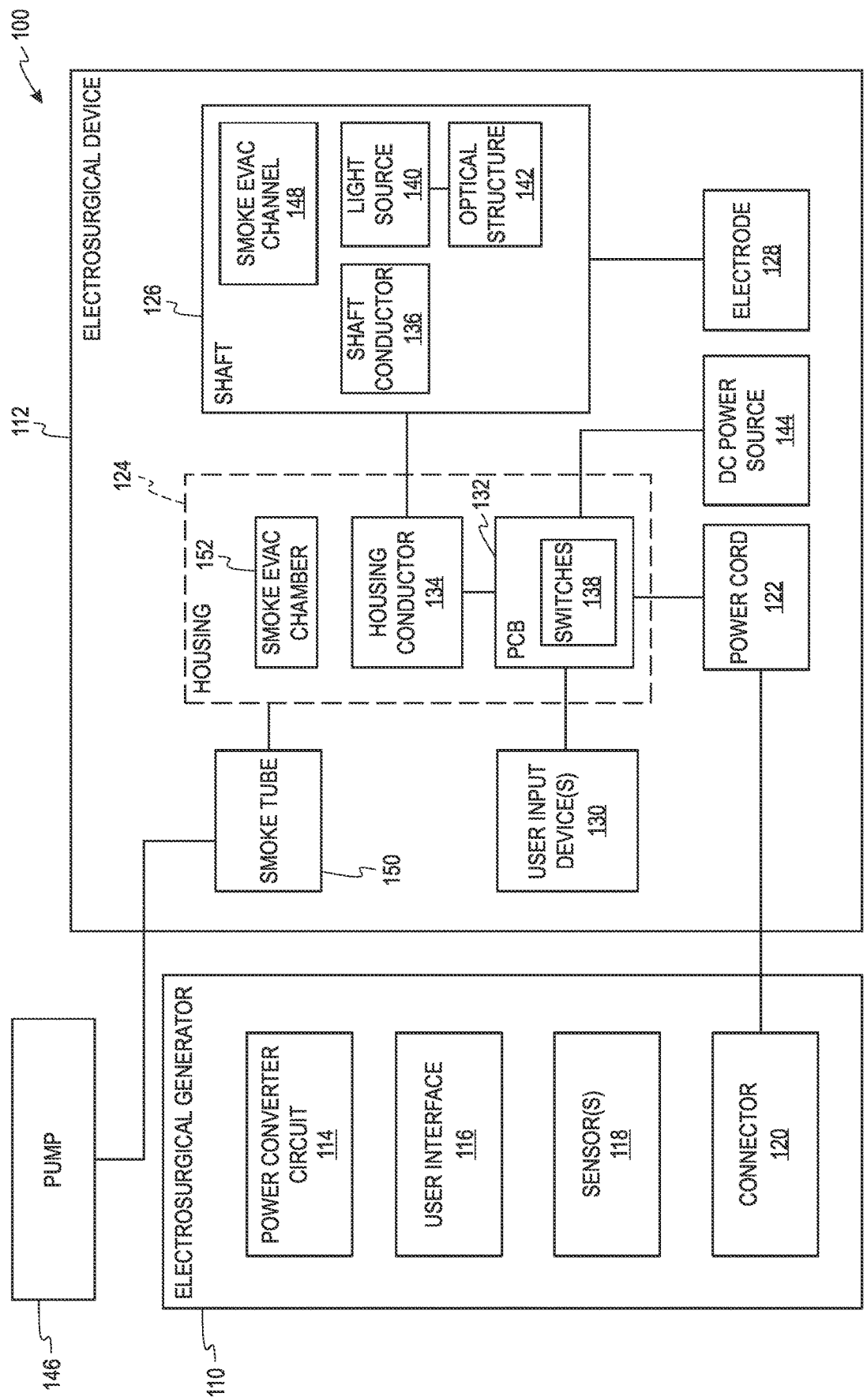
FIG. 1 depicts a simplified block diagram of an electrosurgical system, according to an example.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the term "approximately" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As noted above, an electrosurgical device can use electrical energy supplied by an electrosurgical generator to apply electrosurgical energy from an electrosurgical electrode to a tissue. As such, the electrosurgical device generally includes a housing in which one or more conductors are disposed for supplying the electrosurgical energy to the electrosurgical electrode. Some electrosurgical devices include a shaft that is telescopically adjustable relative to the housing. This can facilitate adjusting a length of the electrosurgical device to treat differently sized and/or shaped target tissues.

Additionally, some electrosurgical devices provide for rotation of the electrosurgical electrode relative to the housing. This can facilitate adjusting an angle of the electrosurgical electrode relative to one or more user input device(s) of the electrosurgical device. In this arrangement, a user can comfortably grip the housing in a position in which their fingers can comfortably operate the user input device(s) while the electrosurgical electrode is set at a rotational position selected from among a plurality of rotational positions relative to the housing based on, for example, a location, a size, and/or a shape of a surgical site in which the user is operating.

However, providing for rotation of the electrosurgical electrode relative to the housing can increase design complexity and a cost of manufacture. For instance, it can be challenging to maintain the electrical connection between electrical components in the housing and the electrosurgical electrode when the electrosurgical electrode rotates relative to the housing and/or telescopically moves relative to the housing. This problem may be further compounded when the electrosurgical device includes other features distal of the housing (e.g., a light source, one or more optical components, and/or smoke evacuation features). Prior approaches generally involve rotating all components that are distal of the housing together. As stated above, this can increase design complexity and the cost of manufacture. The increased complexity can be particularly challenging for electrosurgical devices that provide for both rotation of the electrosurgical electrode and telescopic movement of the shaft relative to the housing.

The present application provides for electrosurgical devices, methods of using electrosurgical devices, and methods of manufacturing electrosurgical devices that can address at least some of the challenges described above.

Referring now to FIG. 1, an electrosurgical system 100 is shown according to an example. As shown in FIG. 1, the electrosurgical system 100 includes an electrosurgical generator 110 and an electrosurgical device 112. In general, the electrosurgical generator 110 can generate electrosurgical energy that is suitable for performing electrosurgery on a patient. For instance, the electrosurgical generator 110 can include a power converter circuit 114 that can convert a grid power to electrosurgical energy such as, for example, a radio frequency (RF) output power. As an example, the power converter circuit 114 can include one or more electrical components (e.g., one or more transformers) that can control a voltage, a current, and/or a frequency of the electrosurgical energy.

Within examples, the electrosurgical generator 110 can include a user interface 116 that can receive one or more inputs from a user and/or provide one or more outputs to the user. As examples, the user interface 116 can include one or more buttons, one or more switches, one or more dials, one or more keypads, one or more touchscreens, one or more display screens, one or more indicator lights, one or more speakers, and/or one or more haptic output devices.

In an example, the user interface 116 can be operable to select a mode of operation from among a plurality of modes of operation for the electrosurgical generator 110. As examples, the modes of operation can include a cutting mode, a coagulating mode, an ablating mode, and/or a sealing mode. Combinations of these waveforms can also be formed to create blended modes. In one implementation, the modes of operation can correspond to respective waveforms for the electrosurgical energy. As such, in this implementation, the electrosurgical generator 110 can generate the electrosurgical energy with a waveform selected from a plurality of waveforms based, at least in part, on the mode of operation selected using the user interface 116.

The electrosurgical generator 110 can also include one or more sensors 118 that can sense one or more conditions related to the electrosurgical energy and/or the target tissue. As examples, the sensor(s) 118 can include one or more current sensors, one or more voltage sensors, one or more temperature sensors, and/or one or more bioimpedance sensors. Within examples, the electrosurgical generator 110 can additionally or alternatively generate the electrosurgical energy with an amount of electrosurgical energy (e.g., an electrical power) and/or a waveform selected from among the plurality of waveforms based on one or more parameters related to the condition(s) sensed by the sensor(s) 118.

In one example, the electrosurgical energy can have a frequency that is greater than approximately 100 kilohertz (kHz) to reduce (or avoid) stimulating a muscle and/or a nerve near the target tissue. In another example, the electrosurgical energy can have a frequency that is between approximately 300 kHz and approximately 500 kHz.

In FIG. 1, the electrosurgical generator 110 also includes a connector 120 that can facilitate coupling the electrosurgical generator 110 to the electrosurgical device 112. For example, the electrosurgical device 112 can include a power cord 122 having a plug, which can be coupled to a socket of the connector 120 of the electrosurgical generator 110. In this arrangement, the electrosurgical generator 110 can supply the electrosurgical energy to the electrosurgical device 112 via the coupling between the connector 120 of the electrosurgical generator 110 and the power cord 122 of the electrosurgical device 112.

As shown in FIG. 1, the electrosurgical device 112 can include a housing 124 defining an interior bore 125 (shown in FIG. 2), a shaft 126 extending in a distal direction from the housing 124, and an electrosurgical electrode 128 coupled to the shaft 126. In general, the housing 124 can be configured to facilitate a user gripping and manipulating the electrosurgical device 112 while performing electrosurgery. For example, the housing 124 can have a shape and/or a size that can facilitate a user performing electrosurgery by manipulating the electrosurgical device 112 using a single hand. In one implementation, the housing 124 can have a shape and/or a size that facilitates the user holding the electrosurgical device 112 in a writing utensil gripping manner (e.g., the electrosurgical device 112 can be an electrosurgical pencil).

Additionally, for example, the housing 124 can be constructed from one or more materials that are electrical insulators (e.g., a plastic material). This can facilitate insulating the user from the electrosurgical energy flowing through the electrosurgical device 112 while performing the electrosurgery.

In some implementations, the shaft 126 can be fixedly coupled to the housing 124. In other implementations, the shaft 126 can be telescopically moveable relative to the housing 124. For example, the shaft 126 can be telescopically moveable in the interior bore 125 defined by the housing 124 to extend the shaft 126 in the distal direction and retract the shaft 126 in a proximal direction relative to the housing 124 (e.g., movable along a longitudinal axis of the electrosurgical device 112). As noted above, the electrosurgical electrode 128 is coupled to the shaft 126 and, thus, the electrosurgical electrode 128 moves together with the shaft 126 in an axial direction along the longitudinal axis relative to the housing 124. This can provide for adjusting a length of the electrosurgical device 112, which can facilitate performing electrosurgery at a plurality of different depths within tissue (e.g., due to different anatomical shapes and/or sizes of patients) and/or at a plurality of different angles.

The electrosurgical electrode 128 can additionally or alternatively be rotatable about an axis of rotation that is parallel to the longitudinal axis of the electrosurgical device 112. In some implementations, the electrosurgical electrode 128 can be rotatable relative to the housing 124 and the shaft 126. In other implementations, the electrosurgical electrode 128 can be rotationally fixed relative to the shaft 126 such that the shaft 126 and the electrosurgical electrode 128 are rotatable together relative to the housing 124 and at least one additional component in an inner cavity defined by the shaft 126. In these implementations, the electrosurgical electrode 128 can be rotatable by more than 360 degrees relative to the housing 124.

Rotating the electrosurgical electrode 128 relative to the housing 124 can facilitate adjusting an angle of the electrosurgical electrode 128 relative to one or more user input device(s) 130 of the electrosurgical device 112. In this arrangement, a user can comfortably grip the housing 124 in a position in which their fingers can comfortably operate the user input device(s) 130 while the electrosurgical electrode 128 is set at a rotational position selected from among a plurality of rotational positions relative to the housing 124 based on, for example, a location, a size, and/or a shape of a surgical site in which the user is operating.

As described above, it can be beneficial to provide for the electrosurgical electrode 128 rotating by more than 360 degrees relative to the housing 124. However, in other implementations, the electrosurgical electrode 128 can be rotatable by less than or equal to 360 degrees (e.g., rotatable by 180 degrees or rotatable by 360 degrees). This may still allow an operator to achieve a desired rotational arrangement, but with the possibility that the operator may rotate in first direction, reach a stop limiting further rotation, and then rotate back in a second direction to achieve the desired rotational arrangement.

The user input device(s) 130 can select between the modes of operation of the electrosurgical device 112 and/or the electrosurgical generator 110. For instance, in one implementation, the user input device(s) 130 can be configured to select between a cutting mode of operation and a coagulation mode of operation. Responsive to actuation of the user input device(s) 130 of the electrosurgical device 112, the electrosurgical device 112 can (i) receive the electrosurgical energy with a level of power and/or a waveform corresponding to the mode of operation selected via the user input device(s) 130 and (ii) supply the electrosurgical energy to the electrosurgical electrode 128.

In FIG. 1, the electrosurgical device 112 includes a plurality of electrical components that facilitate supplying the electrosurgical energy, which the electrosurgical device 112 receives from the electrosurgical generator 110, to the electrosurgical electrode 128. For example, the electrosurgical device 112 can include at least one electrical component selected from a group of electrical components including: a printed circuit board 132 (e.g., a flexible printed circuit board), a housing conductor 134, and/or a shaft conductors 136 that can provide a circuit for conducting the electrosurgical energy from the power cord 122 to the electrosurgical electrode 128. One or more of the electrical components can be positioned in the interior bore 125 defined by the housing 124 and/or in the inner cavity defined by the shaft 126.

Within examples, the user input device(s) 130 can include one or more buttons on an exterior surface of the housing 124. Each button of the user input device(s) 130 can be operable to actuate a respective one of a plurality of switches 138 of the printed circuit board 132. In general, the switches 138 and/or the printed circuit board 132 are operable to control a supply of the electrosurgical energy from the electrosurgical generator 110 to the electrosurgical electrode 128. For instance, in one implementation, when each button is operated (e.g., depressed), the respective switch 138 associated with the button can be actuated to cause the printed circuit board 132 to transmit a signal to the electrosurgical generator 110 and cause the electrosurgical generator 110 to responsively supply the electrosurgical energy with a level of power and/or a waveform corresponding to a mode of operation associated with the button. In another implementation, operating the button and thereby actuating the respective switch 138 associated with the button can close the switch 138 to complete a circuit to the electrosurgical generator 110 to cause the electrosurgical generator 110 to responsively supply the electrosurgical energy with a level of power and/or a waveform corresponding to a mode of operation associated with the button. In some examples of this implementation, the printed circuit board 132 can be omitted.

In both example implementations, the electrosurgical energy supplied by the electrosurgical generator 110 can be supplied from (i) the power cord 122, the printed circuit board 132, and/or the switches 138 to (ii) the electrosurgical electrode 128 by the housing conductor 134 and the shaft conductor 136. As such, as shown in FIG. 1, the printed circuit board 132 can be coupled to the power cord 122, the housing conductor 134 can be coupled to the printed circuit board 132 and the shaft conductor 136, and the shaft conductor 136 can be coupled to the electrosurgical electrode 128. In this arrangement, the housing conductor 134 can conduct the electrosurgical energy (supplied to the housing conductor 134 via the printed circuit board 132) to the shaft conductor 136, and the shaft conductor 136 can conduct the electrosurgical energy to the electrosurgical electrode 128.

In general, the housing conductor 134 and the shaft conductor 136 can each include one or more electrically conductive elements that provide an electrically conductive bus for supplying the electrosurgical energy to the electrosurgical electrode 128. More particularly, the housing conductor 134 can include one or more electrically conductive elements of the housing 124 that can supply the electrosurgical energy to the shaft conductor 136, and the shaft conductor 136 can include one or more electrically conductive elements of the shaft 126 that can supply the electrical energy from the housing conductor 134 to the electrosurgical electrode 128. As described in further detail below, the housing conductor 134 can engage the shaft conductor 136 to maintain an electrical coupling between the housing conductor 134, the shaft conductor 136, and the electrosurgical electrode 128 while (i) the shaft 126 and/or the electrosurgical electrode 128 telescopically moves relative to the housing 124, and/or (ii) the electrosurgical electrode 128 rotates relative to the housing 124.

Although the electrosurgical device 112 includes the user input device(s) 130 in FIG. 1, the user input device(s) 130 can be separate from the electrosurgical device 112 in another example. For instance, the user input device(s) 130 can additionally or alternatively include one or more foot pedals that are actuatable to control operation of the electrosurgical device 112 as described above. The foot pedal(s) can be communicatively coupled to the electrosurgical generator 110 to provide a signal responsive to actuation of the foot pedal(s).

As shown in FIG. 1, the electrosurgical device 112 can additionally include a light source 140 that is configured to emit light. In the example of FIG. 1, the light source 140 can be optically coupled to an optical structure 142, which is configured to receive the light emitted by the light source 140 and transmit the light in a distal direction toward a surgical site to illuminate the surgical site while performing electrosurgery using the electrosurgical electrode 128.

As examples, the optical structure 142 can include at least one optical structure selected from among a group consisting of an optical lens, an optical waveguide, and an optical fiber. When the optical structure 142 includes the optical lens (e.g., a parabolic reflector lens), the optical lens 142 can help to direct the light emitted by the light source 140 in the distal direction and thereby improve a quality of the light illuminating the surgical site. The optical structure 142 can additionally or alternatively include the optical waveguide and/or the optical fiber to transmit the light over relatively large distances in the shaft 126. For instance, the optical waveguide can transmit the light in the distal direction via total internal reflection. In such implementations, the optical waveguide can include a cladding and/or an air gap on an exterior surface of the optical waveguide to help facilitate total internal reflection. In some implementations, the optical waveguide can be formed as a single, monolithic structure.

In some examples, the optical structure 142 can additionally or alternatively include other light shaping optical elements such as, for instance, a plurality of facets, one or more prisms, and/or one or more optical gratings. Although the optical structure 142 can help to improve a quality of the light directed to the surgical site, the electrosurgical device 112 can omit the optical structure 142 and instead emit the light from the light source 140 directly to the surgical field without transmitting the light through the optical structure 142 in other examples.

In FIG. 1, the light source 140 is coupled to the shaft 126. As such, the light source 140 can also move telescopically with the shaft 126 relative to the housing 124. However, in other examples, the light source 140 can be in the interior bore of the housing 124 and/or coupled to an exterior surface of the housing 124. As examples, the light source 140 can include one or more light emitting diodes (LEDs), organic light emitting diodes (OLEDs), optical fibers, non-fiber optic waveguides, and/or lenses. Additionally, for example, the light source 140 can include a light-emitting diode printed circuit board (LED PCB) having one or more light sources (e.g., LEDs). As described in further detail below, the LED PCB can include an aperture, and one or more other components (e.g., the electrosurgical electrode 128) of the electrosurgical device 112 can extend through the aperture.

The optical structure 142 can be at a distal end of the shaft 126. In some examples, the optical structure 142 can circumferentially surround the electrosurgical electrode 128 to emit the light distally around all sides of the electrosurgical electrode 128. This can help to mitigate shadows and provide greater uniformity of illumination in all rotational alignments of the shaft 126 relative to the housing 124 and/or the electrosurgical device 112 relative to the target tissue.

In implementations that include the light source 140, the user input device(s) 130, the printed circuit board 132, the switches 138, the housing conductor 134, and/or the shaft conductor 136 can additionally supply an electrical power from a direct current (DC) power source 144 to the light source 140. In one example, the DC power source 144 can include a battery disposed in the housing 124 and/or the plug of the power cord 122. Although the electrosurgical device 112 includes the DC power source 144 in FIG. 1, the DC power source 144 can be separate and distinct from the electrosurgical device 112 in other examples. For instance, in another example, the electrosurgical generator 110 can include the DC power source 144.

Additionally, in implementations that include the light source 140, the user input device(s) 130 can be operable to cause the light source 140 to emit the light. In one example, the user input device(s) 130 can include a button that independently controls the light source 140 separate from the button(s) that control the electrosurgical operational modes of the electrosurgical device 112. In another example, the user input device(s) 130 and the printed circuit board 132 can be configured such that operation of the button(s) that control the electrosurgical operational mode simultaneously control operation of the light source 140 (e.g., the light source 140 can be automatically actuated to emit light when a button is operated to apply the electrosurgical energy at the electrosurgical electrode 128).

As shown in FIG. 1, responsive to operation of the user input device(s) 130 to actuate the light source 140, the DC power source 144 can supply the electrical power (e.g., a DC voltage) to the light source 140 via the printed circuit board 132, the housing conductor 134, and/or the shaft conductor 136. In this implementation, one or more of the conductive elements of the housing conductor 134 can be configured to supply the electrical power from the DC power source 144 to the light source 140 and/or return the electrical power from the light source 140 to the DC power source 144. Accordingly, the housing conductor 134 can additionally or alternatively assist in providing electrical communication between the DC power source 144 and the light source 140 as the shaft 126 and the light source 140 telescopically move relative to the housing 124.

Although the user input device(s) 130 on the housing 124 can be operated to control the operation of the light source 140 in the examples described above, the light source 140 can be additionally or alternatively operated by one or more user input device(s) on the electrosurgical generator 110 (e.g., via the user interface 116) and/or on the plug of the power cord 122.

As noted above, the electrosurgical device 112 can additionally include features that provide for evacuating surgical smoke from a target tissue to a location external to the surgical site. Surgical smoke is a by-product of various surgical procedures. For example, during surgical procedures, surgical smoke may be generated as a by-product of electrosurgical units (ESU), lasers, electrocautery devices, ultrasonic devices, and/or other powered surgical instruments (e.g., bones saws and/or drills). In some instances, the surgical smoke may contain toxic gases and/or biological products that result from a destruction of tissue. Additionally, the surgical smoke may contain an unpleasant odor. For these and other reasons, many guidelines indicate that exposure of surgical personnel to surgical smoke should be reduced or minimized.

To reduce (or minimize) exposure to surgical smoke, a smoke evacuation system may be used during the surgical procedure. In general, the smoke evacuation system may include a suction pump 146 that can generate sufficient suction and/or vacuum pressure to draw the surgical smoke away from the surgical site. In some implementations, the smoke evacuation system may be coupled to an exhaust system (e.g., an in-wall exhaust system) that exhausts the surgical smoke out of an operating room. In other implementations, the smoke evacuation system may filter air containing the surgical smoke and return the air to the operating room. Within examples, the suction pump 146 and the electrosurgical generator 110 can be provided as separate devices or integrated in a single device (e.g., in a common housing).

As shown in FIG. 1, the shaft 126 can include a smoke evacuation channel 148 in the inner cavity of the shaft 126. The smoke evacuation channel 148 can also include a smoke inlet that can extend circumferentially around a center axis of a distal portion of the electrosurgical electrode 128. In this arrangement, the smoke inlet of the smoke evacuation channel can help to receive surgical smoke into the smoke evacuation channel 148 in all rotational alignments of the electrosurgical electrode 128 relative to the housing 124 and/or the electrosurgical device 112 relative to the target tissue. However, in another example, the smoke evacuation channel 148 can include one or more smoke inlets that do not extend circumferentially around the electrosurgical electrode 128.

In some implementations, the smoke evacuation channel 148 and the optical structure 142 can be coaxial. For instance, the smoke evacuation channel 148 and the optical structure 142 can each have a longitudinal axis that is aligned with a central axis of the shaft 126. In other implementations, the smoke evacuation channel 148 and the optical structure 142 can have respective longitudinal axes that are offset relative to each such that the smoke evacuation channel 148 and the optical structure 142 are not coaxial.

In an example, the smoke evacuation channel 148 can include an outer tube that is separated from the optical structure 142 by an air gap. For instance, the shaft 126 can include a plurality of standoffs that extend between the optical structure 142 and the outer tube of the smoke evacuation channel 148 to provide the air gap between the outer tube and the optical structure 142. In one implementation, the optical structure 142 can include the standoffs such that the optical structure 142 and the standoffs are formed as a single, monolithic structure. In another implementation, the standoffs can be formed as a single, monolithic structure with the outer tube of the smoke evacuation channel 148. In another implementation, the standoffs can be separate from the outer tube of the smoke evacuation channel 148 and the optical structure 142.

Figure 2:
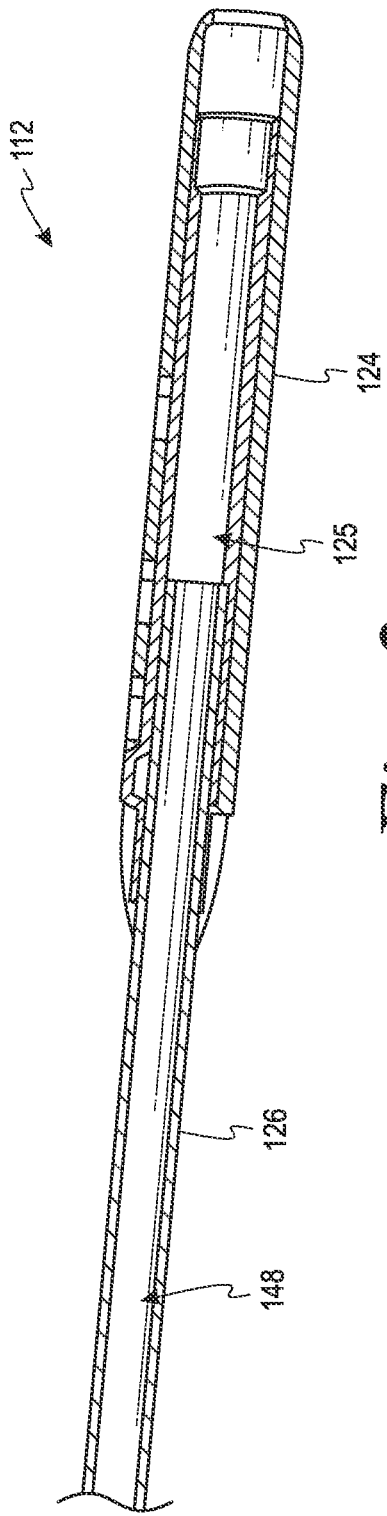
FIG. 2 depicts a cross-sectional view of an electrosurgical device, according to an example.

In an example, the smoke evacuation channel 148 of the shaft 126 defines a first portion of a smoke flow path, and the interior bore 125 of the housing 124 defines a second portion of a smoke flow path. FIG. 2 illustrates a partial cross-sectional view of the electrosurgical device 112 according to an implementation of this example. In this arrangement, the surgical smoke can be received from the surgical site into the smoke evacuation channel 148 of the shaft 126, and flow proximally along the smoke evacuation channel 148 to the interior bore 125 of the housing 124. In the interior bore 125 of the housing 124, the smoke can further flow to a smoke tube 150 that is coupled to a proximal end of the housing 124 and configured to convey smoke from the housing 124 to the suction pump 146.

Figure 3:
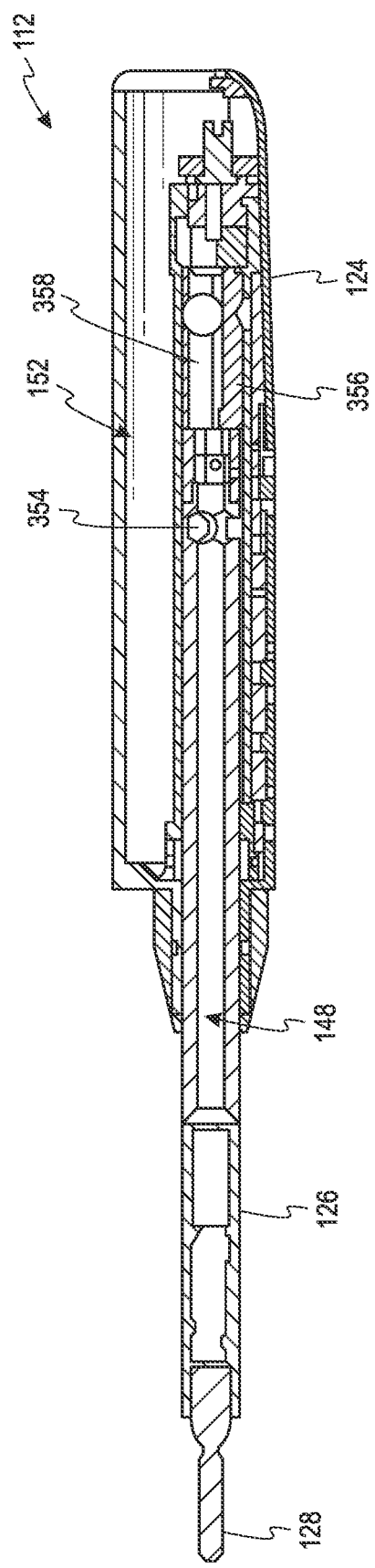
FIG. 3 depicts a cross-sectional view of an electrosurgical device, according to an example.

In another example, the housing 124 includes an interior wall separating the interior bore 125 from a smoke evacuation chamber 152 in the housing 124. The smoke evacuation channel 148 of the shaft 126 is in fluid communication with the smoke evacuation chamber 152 of the housing 124. In this example, the smoke evacuation channel 148 of the shaft 126 defines a first portion of a smoke flow path, and the smoke evacuation chamber 152 of the housing 124 defines a second portion of a smoke flow path. FIG. 3 illustrates a partial cross-sectional view of the electrosurgical device 112 according to an implementation of this example. Accordingly, in this example, the smoke is routed through the smoke evacuation chamber 152, which is separate from the interior bore 125, to the smoke tube 150 at the proximal end of the housing 124. This can beneficially help to mitigate exposing one or more components of the electrosurgical device 112 to the surgical smoke in the housing 124. In some implementations, providing a separate smoke evacuation chamber 152 can additionally or alternatively help to improve the flow of surgical smoke by reducing (or eliminating) obstacles and impediments to gas flows along the second portion of the flow path.

In one implementation, a proximal portion of the smoke evacuation channel 148 comprises at least one aperture 354, and the interior wall of the housing 124 includes at least one slot. The at least one aperture 354 of the smoke evacuation channel 148 can be aligned with the at least one slot 358 of the interior wall 356 of the housing 124 such that the smoke evacuation channel 148 of the shaft 126 is in fluid communication with the smoke evacuation chamber 152 of the housing 124. The at least one aperture 354 is axially movable along the at least one slot 358 when the shaft 126 telescopically moves relative to the housing 124 such that the smoke evacuation channel 148 of the shaft 126 is in fluid communication with the smoke evacuation chamber 152 of the housing 124 when the shaft 126 telescopically moves relative to the housing 124.

In an example, the at least one aperture 354 includes a plurality of apertures 354 and the at least one slot 358 includes a plurality of slots 358. Also, in this example, each apertures 354 is aligned with a respective one of the plurality of slots 358, and the shaft 126 is rotatable relative to the housing 124, and the plurality of apertures 354 and the plurality of slots 358 are arranged around a circumference of the shaft 126 such that fluid communication between the smoke evacuation channel 148 and the smoke evacuation chamber 152 is maintained when the shaft 126 is rotated relative to the housing 124. In one implementation, the interior wall 356 and the slot(s) 358 can rotate together with the shaft 126 and the aperture(s) 354. By providing a plurality of apertures 354 and respective slots 358, at least one pair of aperture 354 and slot 358 can be rotationally aligned with the smoke evacuation chamber 152 and thereby provide fluid communication between the smoke evacuation channel 148 and the smoke evacuation chamber 152.

Figure 4A:
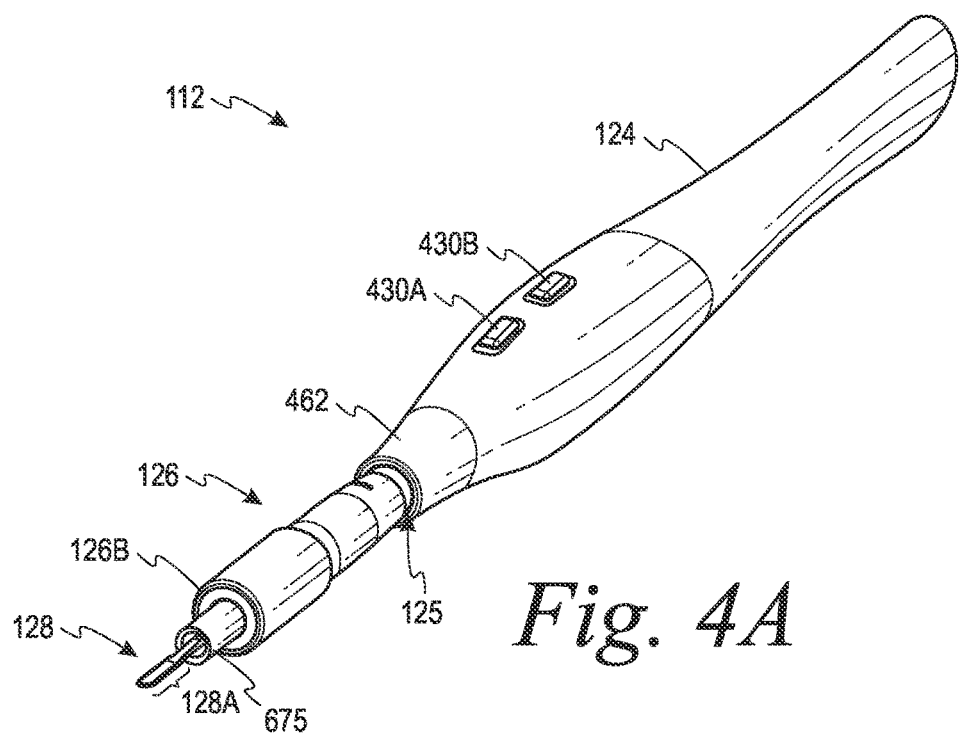
FIG. 4A depicts a perspective view of an implementation of the electrosurgical device of FIG. 1 with a shaft in a first axial position relative to a housing, according to an example.

Referring now to FIG. 4A-9, an implementation of the electrosurgical device 112 is shown according to an example. As shown in FIGS. 4A-4B, the electrosurgical device 112 includes the housing 124, the shaft 126 is coupled to the housing 124, and the electrosurgical electrode 128 is coupled to the shaft 126. The housing 124 defines an interior bore 125, and the shaft 126 extends distally from the interior bore 125 of the housing 124. Also, in FIGS. 4A-4B, a distal portion 128A of the electrosurgical electrode 128 extends distally from the shaft 126. Within examples, the distal portion 128A of the electrosurgical electrode 128 can define a working end that is configured to apply electrosurgical energy to tissue.

Figure 4B:
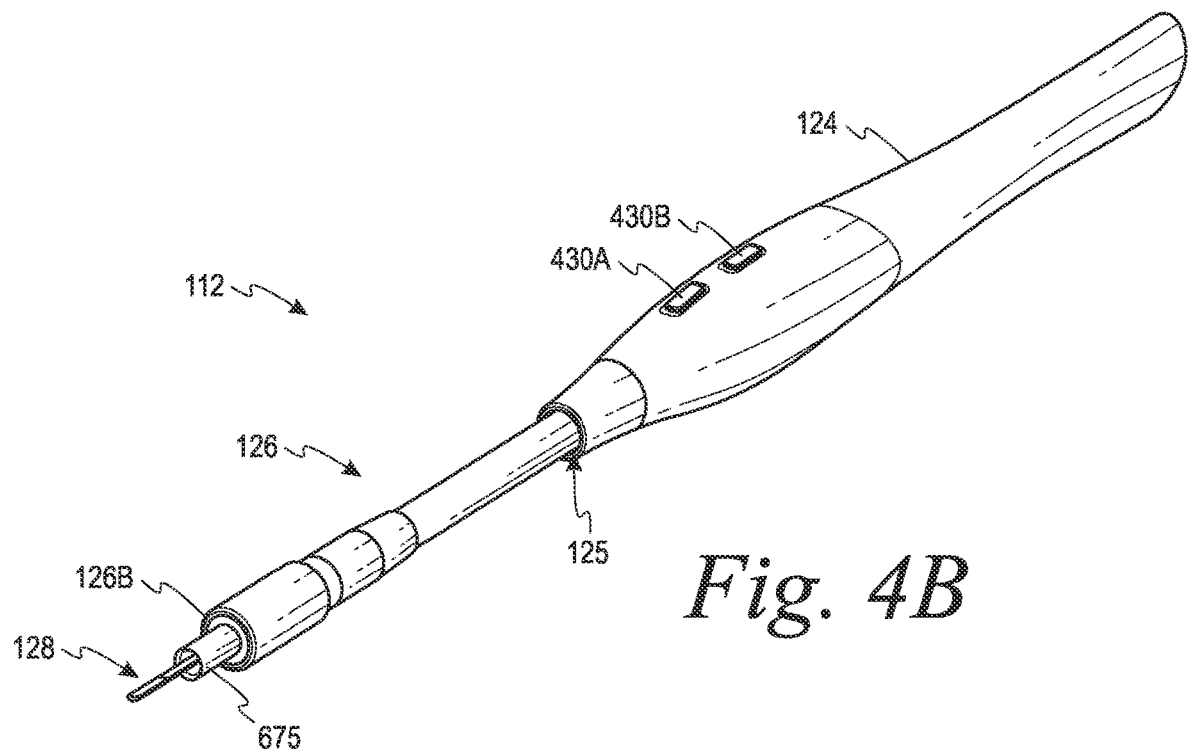
FIG. 4B depicts a perspective view of the implementation of the electrosurgical device of FIG. 4A with a shaft in a second axial position relative to the housing, according to an example.

In FIGS. 4A-4B, the shaft 126 is telescopically movable in the interior bore 125 of the housing 124 to adjust a distance of a distalmost tip of the electrosurgical electrode 128 relative to the housing 124. For instance, FIG. 4A shows the shaft 126 in a first position relative to the housing 124 along a longitudinal axis of the electrosurgical device 112, and FIG. 4B shows the shaft 126 in a second position relative to the housing 124 along the longitudinal axis of the electrosurgical device 112. In FIGS. 4A-4B, the first position is proximal of the second position such that the shaft 126 is in a retracted position in the housing 124 in the first position and the shaft 126 is in an extended position out of the housing 124 in the second position. As noted above, telescopically moving the shaft 126 relative to the housing 124 can facilitate adjusting a length of the electrosurgical device to treat differently sized and/or shaped target tissues. However, as described above, the shaft 126 can be fixedly coupled to the housing 124 such that the shaft 126 is not moveable relative to the housing 124 in other examples.

In some examples, the electrosurgical device 112 can include a collar 462 at a proximal end of the housing 124. The collar 462 can be rotatable relative to the housing 124 to increase and/or decrease friction between an outer surface of the shaft 126 and an inner surface of the collar 462. In this way, the collar 462 to allow and/or inhibit axial telescopic movement of the shaft 126 relative to the housing 124.

Additionally, in FIGS. 4A-4B, the shaft 126 is rotationally fixed relative to the housing 124, and the electrosurgical electrode 128 is rotatable relative to the housing 124 and the shaft 126. This can simplify the design and reduce a cost of manufacture of the electrosurgical device 112. For example, this arrangement of the housing 124, the shaft 126, and the electrosurgical electrode 128 can simplify electrical connections between the housing conductor 134, the shaft conductor 1236, and the electrosurgical electrode 128. Additionally, this arrangement can help to mitigate damage to the electrical connections during telescopic movement of the shaft 126 relative to the housing 124, and/or during rotation of the electrosurgical electrode 128 relative to the shaft 126 and the housing 124.

Figure 5:
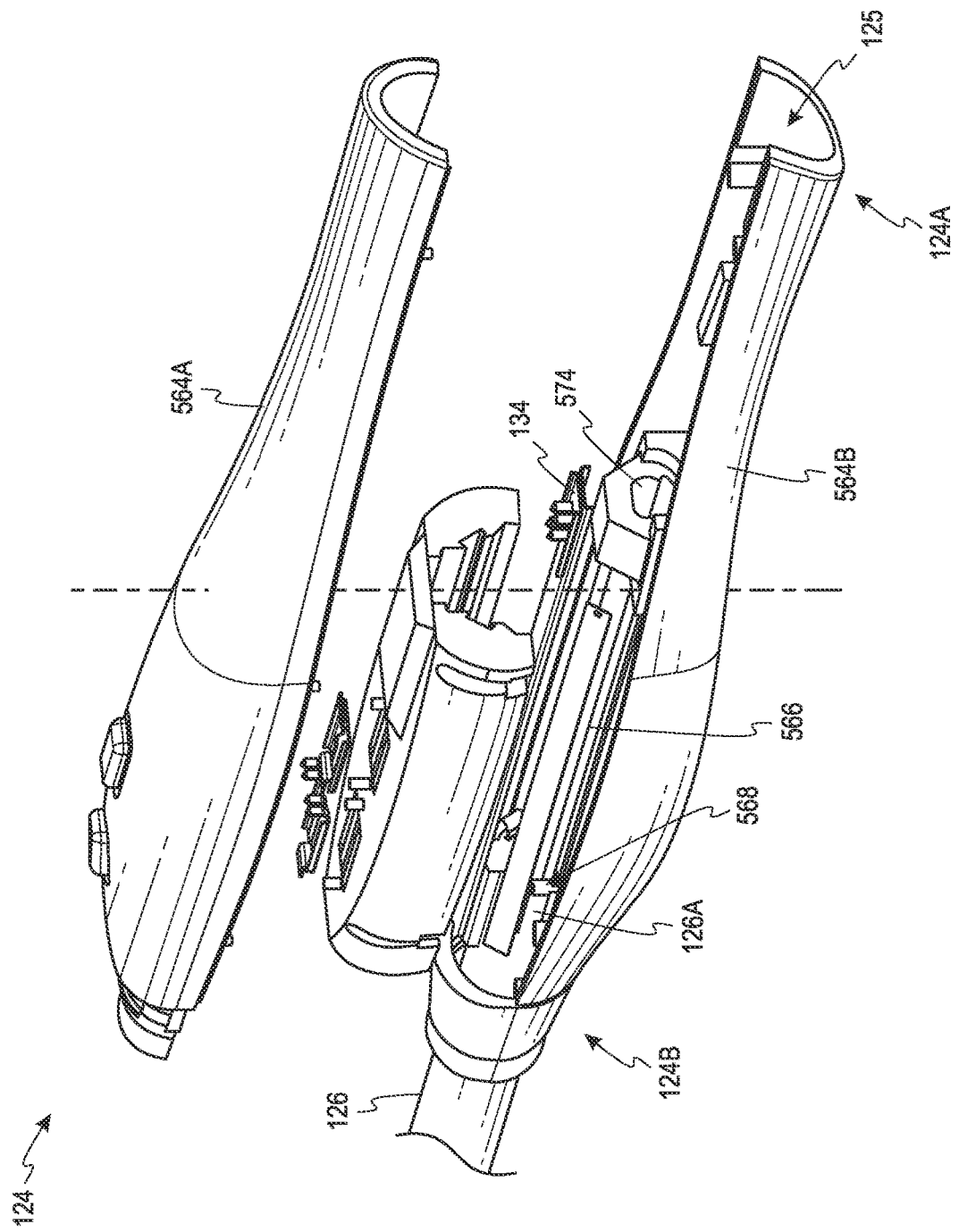
FIG. 5 depicts a partially exploded view of the housing of the electrosurgical device shown in FIGS. 4A-4B, according to an example.

FIGS. 5-9 depict additional aspects of the electrosurgical device 112 that can facilitate the telescopic and rotational movements described above. FIG. 5 depicts a partially exploded view of the housing 124. As shown in FIG. 5, the housing 124 can include a top portion 564A that can be coupled to a bottom portion 564B to define the interior bore 125 between the top portion 564A and the bottom portion 564B. In general, the interior bore 25 can be a space within the housing 124 in which one or more components of the electrosurgical device 112 can be housed.

In the interior bore 125 of the housing 124, the electrosurgical device 112 includes a shaft guide 566 that extends along a direction that is parallel to a longitudinal axis of the housing 124 (e.g., a direction extending between a proximal end 124A of the housing 124 and a distal end 124B of the housing 124). The shaft guide 566 is configured to extend in an inner cavity 568 of the shaft 126. The inner cavity 568 of the shaft 126 can be a bore that extends between a proximal end 126A of the shaft 126 to a distal end 126B of the shaft 126 (shown in FIGS. 4A-4B). As such, the inner cavity 568 can be defined by an inner surface of the shaft 126.

As shown in FIG. 5, the shaft guide 566 can have a cross-sectional shape that is non-circular to assist in preventing rotation between the shaft 126 and the housing 124. For instance, an outer surface of the shaft guide 566, which extends in the inner cavity 568 of the shaft 126, can have a non-circular shape that engages a non-circular shape of the inner surface of the shaft 126 in the inner cavity 568 of the shaft 126. In this arrangement, the shaft 126 can slide over the shaft guide 566 in a proximal direction and a distal direction (e.g., along the longitudinal axis of the housing 124), but the shaft 126 is prevented from rotating relative to the shaft guide 566 due to the engagement between (i) the inner surface of the inner cavity 568 of the shaft 126, and (ii) the outer surface of the shaft guide 566.

Also, as shown in FIG. 5, the shaft guide 566 is rotationally fixed relative to the housing 124. For instance, a portion of the shaft guide 566 can have a non-circular shape that can engage a structure in the housing 124 that has a corresponding shape. In FIG. 5, for example, a proximal portion of the shaft guide 566 has a hexagonal feature that engages a hexagonally shaped socket formed in an interior wall of the housing 124 (e.g., an interior wall of the top portion 564A and/or the bottom portion 564B of the housing 124) to prevent rotation between the shaft guide 566 and the housing 124. In this arrangement, the shaft 126 is rotationally fixed relative to the housing 124 as a result of a first non-rotational engagement between the shaft 126 and the shaft guide 566, and a second non-rotational engagement between the shaft guide 566 and the housing 124.

As noted above, the electrosurgical electrode 128 is coupled to the shaft 126 and the electrosurgical electrode 128 is rotatable relative to the housing 124 and the shaft 126. An example arrangement for coupling the electrosurgical electrode 128 to the shaft 126 in a manner that allows for such rotation of the electrosurgical electrode 128 is shown in FIGS. 6-7. FIG. 6 depicts a cross-sectional view of a distal portion of the housing 124, the shaft 126, and the electrosurgical electrode 128 for the example implementation shown in FIGS. 4A-4B. FIG. 6 also depicts a portion of the housing conductor 134 and an electrical contact 670 of the shaft conductor 136 according to an example. FIG. 7 depicts a perspective view of the electrical contact 670 shown in FIG. 6.

As shown in FIG. 6, the shaft 126 can include the electrical contact 670, which is coupled to a proximal portion 128B of the electrosurgical electrode 128. In particular, the electrical contact 670 is coupled to the proximal portion 128B of the electrosurgical electrode 128 such that the electrosurgical electrode 128 is rotatable relative to the electrical contact 670. In this example, the electrosurgical electrode 128 and the electrical contact 670 are electrically coupled in all rotational positions of the electrosurgical electrode 128 relative to the electrical contact 670.

In an example, the electrical contact 670 can frictionally engage the proximal portion 128B of the electrosurgical electrode 128 such that (i) the electrical contact 670 inhibits rotation of the electrosurgical electrode 128 relative to the electrical contact 670 when a force that is less than a threshold force is applied to the electrosurgical electrode 128, and (ii) the electrical contact 670 allows rotation of the electrosurgical electrode 128 relative to the electrical contact 670 when a force that is greater than the threshold force is applied to the electrosurgical electrode 128. The threshold force can be an amount of force that is great enough to prevent the electrosurgical electrode 128 from freely rotating under only a gravitational force, and/or prevent the electrosurgical electrode 128 from rotating when the electrosurgical electrode 128 is used to cut and/or coagulate tissue. The threshold force can additionally or alternatively be an amount of force that is low enough to allow a user to manually rotating the electrosurgical electrode 128 relative to the housing 124 without the use of a separate tool or instrument.

To assist with providing the frictional engagement between the proximal portion 128B of the electrosurgical electrode 128 and the electrical contact 670, the electrical contact 670 can extend around at least half of a circumference of the proximal portion 128B of the electrosurgical electrode 128. For example, in FIG. 7, the electrical contact 670 includes a pair of arms 671 that extend around more than half of the circumference of the proximal portion 128B of the electrosurgical electrode 128 and are biased inwardly to apply a force to the proximal portion 128B of the electrosurgical electrode 128. The force applied by the electrical contact 670 can thus help to control the rotation of the electrosurgical electrode 128 relative to the shaft 126 and the housing 124. Additionally, in this arrangement, the arms 671 of the electrical contact 670 can allow the electrosurgical electrode 128 to rotate by more than 360 degrees about an axis of rotation (e.g., a center axis of the electrosurgical electrode 128).

The electrical contact 670 can also assist in axially retaining the electrosurgical electrode 128 in the inner cavity 568 of the shaft 126. For instance, the proximal portion 128B of the electrosurgical electrode 128 can include a first shoulder 772A that can engage the electrical contact 670 to inhibit or prevent axial movement of the electrosurgical electrode 128 relative to the shaft 126 in the distal direction. Additionally, for instance, the proximal portion 128B of the electrosurgical electrode 128 can include a second shoulder 772B that can engage a stop 773 of the shaft 126 to inhibit axial movement of the electrosurgical electrode 128 relative to the shaft 126 in the proximal direction.

In some examples, the engagement between the first shoulder 772A and the electrical contact 670 can inhibit or prevent removal of the electrosurgical electrode 128 from the shaft 126 such that the electrosurgical electrode 128 is fixedly coupled to the shaft 126. In alternative examples, the engagement between the first shoulder 772A and the electrical contact 670 can allow for the electrosurgical electrode 128 to be removed and replaced with another electrosurgical electrode 128.

Additionally, as shown in FIGS. 6-7, the electrical contact 670 can include a first end 670A that is coupled to the proximal portion 128B of the electrosurgical electrode 128, and a second end 670B that extends into the housing 124. As shown in FIG. 6, the second end 670B engages the housing conductor 134 that extends along the housing 124 in a direction parallel to a longitudinal axis of the housing 124. In this example, the second end 670B of the electrical contact 670 is configured to remain engaged with the housing conductor 134 while the shaft 126 moves telescopically relative to the housing 124. For instance, the electrical contact 670 is fixedly coupled to the shaft 126 such that the electrical contact 670 moves with the shaft 126 relative to the housing 124. In this arrangement, the second end 670B of the electrical contact 670 can continuously engage and electrically couple to the housing conductor 134 while the second end 670B slides along the housing conductor 134 responsive to the shaft 126 moving axially relative to the housing 124. In this way, the electrical contact 670 can facilitate supplying electrosurgical energy to the electrosurgical electrode 128 in any rotational position and/or in any axial position of the electrosurgical electrode 128 relative to the housing 124.

As shown in FIG. 6, the shaft 126 can also include the smoke evacuation channel 148 extending from a proximal end 126A of the shaft 126 to a distal end 126B of the shaft 126. For instance, in FIGS. 4A, 4B, and 6, the electrosurgical electrode 128 extends through the inner cavity 568 of the shaft 126 such that smoke evacuation channel 148 can include a gap defined between the electrosurgical electrode 128 and the inner surface of the shaft 126. In the illustrated example, the shaft 126 has a center axis that extends between the proximal end 126A and the distal end 126B, and the electrosurgical electrode 128 has a center axis that is collinear with the center axis of the shaft 126. In this arrangement, the smoke evacuation channel 148 can have a substantially constant size around a circumference of the electrosurgical electrode 18. This can help to provide relatively consistent suction each point around the electrosurgical electrode 128. However, in other examples, the center axes of the electrosurgical electrode 128 and the shaft 126 can be offset and parallel relative to each other.

Referring to FIG. 5, the inner cavity 568 at the proximal end 126A of the shaft 126 can provide a proximal end of the smoke evacuation channel 148 (shown in FIG. 6). The proximal end of the smoke evacuation channel 148 can be in fluid communication with the smoke evacuation chamber 152 of the housing 124. For instance, in FIG. 5, the smoke evacuation chamber 152 can include a bore 574 in the shaft guide 566 and a portion of the interior bore 125 of the housing 124 that is proximal of the shaft guide 566.

Referring again to FIG. 6, the electrosurgical device 112 can also include a suction sleeve 675 that can be fluidly coupled to the smoke evacuation channel 148. As shown in FIG. 6, a distal portion 675A of the suction sleeve 675 can extend distally from the distal end 126B of the shaft 126, and the electrosurgical electrode 128 can extend through the suction sleeve 675. In particular, the suction sleeve 675 can be spaced apart from the electrosurgical electrode 128 to define a smoke inlet that can extend circumferentially around the center axis of the distal portion 128A of the electrosurgical electrode 128.

In an example, the suction sleeve 675 can be rotationally fixed relative to the electrosurgical electrode 128 such that rotation of the suction sleeve 675 relative to the shaft 126 causes a corresponding rotation of the electrosurgical electrode 128 relative to the shaft 126 and the housing 124. In this arrangement, the user can use the suction sleeve 675 to rotate the electrosurgical electrode 128 relative to the housing 124. This can beneficially allow the user to avoid directly touching the electrosurgical electrode 128 as the electrosurgical electrode 128 may be at relatively elevated temperatures after or during use. Additionally, because directly touching the electrosurgical electrode 128 may negatively impact a coating on the electrosurgical electrode 128, the suction sleeve 675 can help to maintain the structural integrity and operational performance of the electrosurgical electrode 128.

In FIG. 6, the suction sleeve 675 includes one or more teeth 676, and the electrosurgical electrode 128 includes one or more slots 677. Each of the one or more teeth 676 of the suction sleeve 675 are in a respective one of the one or more slots 677 such that the one or more teeth 676 engage the one or more slots 677 to cause the electrosurgical electrode 128 to rotate responsive to rotation of the suction sleeve 675. However, in another example, the suction sleeve 675 can include the one or more slots 677 and the electrosurgical electrode 128 can include the one or more teeth 676.

In some examples, the suction sleeve 675 can be telescopically moveable in the inner cavity 568 of the shaft 126 to adjust a distance between the suction sleeve 675 and a distalmost tip of the electrosurgical electrode 128. For instance, each of the one or more teeth 676 can be configured to slide longitudinally in the respective one of the one or more slots 677 responsive to the suction sleeve 675 telescopically moving relative to the shaft 126 and/or the electrosurgical electrode 128. In this telescoping arrangement, the suction sleeve 675 can move relative to the shaft 126 and the electrosurgical electrode 128 to adjust an extent of the distal portion 128A of the electrosurgical electrode 128 that is exposed. Specifically, the suction sleeve 675 can be (i) moved toward the distal end 126B of the shaft 126 to expose a greater extent of the electrosurgical electrode 128 and improve visibility at the surgical site, and (ii) moved away from the distal end 126B of the shaft 126 to expose a lesser extent of the electrosurgical electrode 128 and capture relatively greater amounts of smoke at the surgical site.

Although it can be beneficial for the suction sleeve 675 to be telescopically movable relative to the shaft 126 and/or the electrosurgical electrode 128, the suction sleeve 675 can be axially fixed relative to the shaft 126 and/or the electrosurgical electrode 128 in other examples.

In one example, the suction sleeve 675 can be substantially transparent such that the electrosurgical electrode is visible through the suction sleeve. This can help to help improve visibility of the electrosurgical electrode 128. However, in other examples, the suction sleeve 675 can be made from an opaque material.

Figure 8:
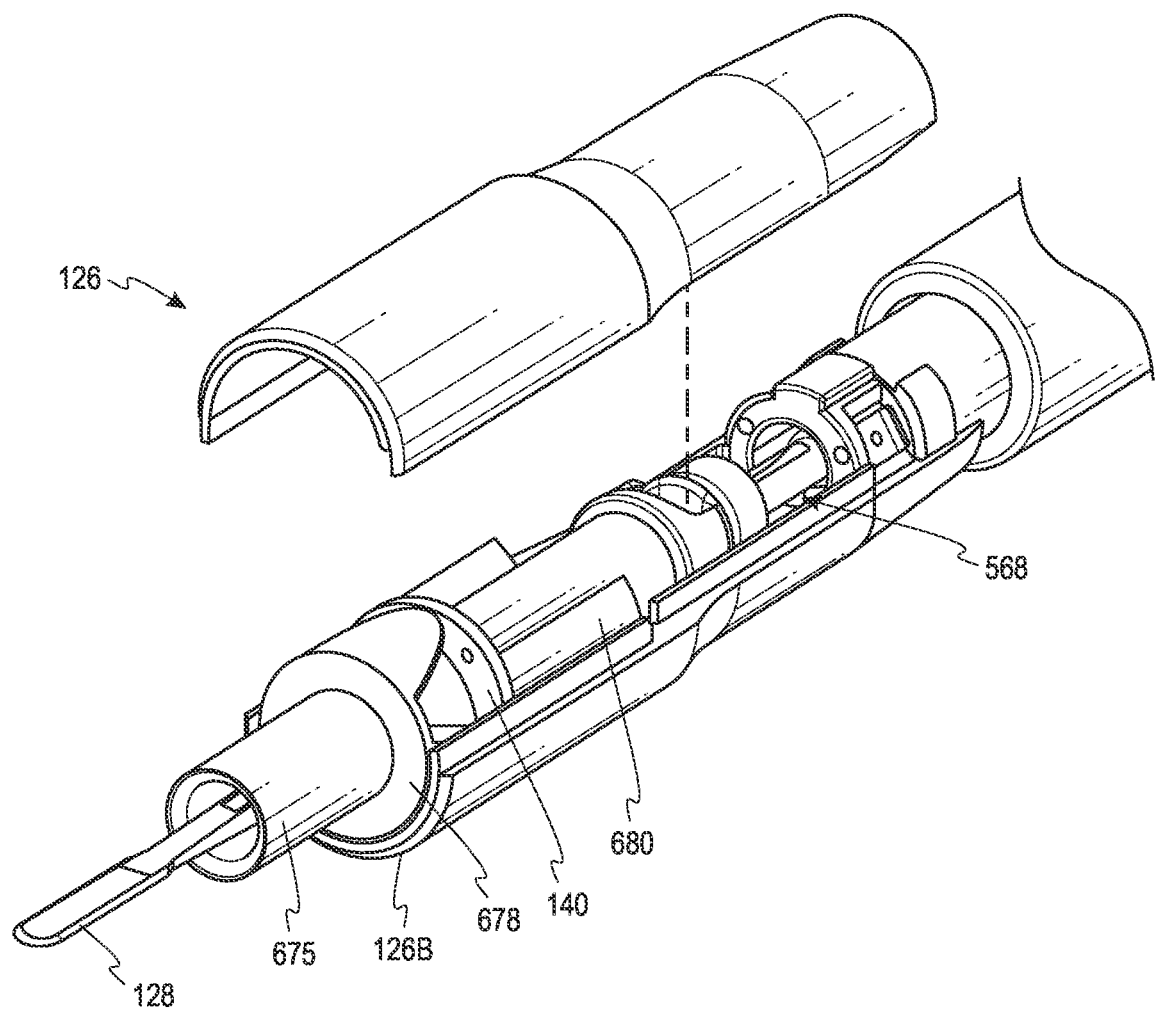
FIG. 8 depicts a distal portion of the shaft with a top portion removed to show optical components located in an inner cavity of the shaft for the example implementation shown in FIGS. 4A-4B, according to an example.

FIG. 8 depicts a distal portion of the shaft 126 with a top portion removed to show optical components located in the inner cavity 568 of the shaft 126. As shown in FIGS. 6 and 8, the electrosurgical device 112 can also include a light source 140 in the inner cavity 568 of the shaft 126. The light source 140 is configured to emit light in a direction toward the distal end 126B of the shaft 126. In this example, the light source 140 is a LED PCB that includes three light sources (e.g., LEDs) equally spaced from each other around a circumference of the electrosurgical electrode 128. Providing at least three light sources arranged around the circumference of the electrosurgical electrode 128 can help to mitigate shadows and provide greater uniformity of illumination in all rotational alignments of the electrosurgical electrode 128 relative to the housing 124 and/or the electrosurgical device 112 relative to the target tissue. Although the light source 140 includes three light sources in FIG. 8, the light source 140 can include a different quantity of light sources in other examples.

Additionally, the electrosurgical device 112 can include an optical lens 678 that is configured to transmit the light from the light source 140 in a distal direction and emit the light from the distal end 126B of the shaft 126. As an example, the optical lens 678 can include three parabolic lenses and each parabolic lens can be aligned with a respective one of the light sources. The parabolic lenses of the optical lens 678 can be configured to direct off-axis light (e.g., light that is transverse to the longitudinal axis of the shaft 126) toward the distal end 126B of the shaft 126. In other examples, the electrosurgical device 112 can include another optical structure 142 in additional or alternative to the optical lens 678, as described above. Alternatively, the electrosurgical device 112 can omit the optical structure 142, as described above.

As shown in FIG. 8, the electrosurgical electrode 128 can extend through an aperture in the optical lens 678 and an aperture in the light source 140. This can help to distribute the light around the entire circumference of the electrosurgical electrode 128, which can help to mitigate shadows and provide greater uniformity of illumination in all rotational alignments of the electrosurgical electrode 128 relative to the housing 124 and/or the electrosurgical device 112 relative to the target tissue. However, in other examples, the optical lens 678 may not extend entirely around the electrosurgical electrode 128 at the distal end 126B of the shaft 126, and/or the optical lens 649 can be at a different position on the shaft 126 and/or the housing 124.

Additionally, in FIG. 8, the suction sleeve 675 can extend through the aperture in the optical lens 678 and the aperture in the light source 140. This can help to reduce cross-sectional dimensions of the suction sleeve 675 and thereby improve a line of sight for the electrosurgical electrode 128 (as compared to if light source 140 and/or the optical lens 678 were within an aperture of the suction sleeve 675).

As shown in FIG. 8, the electrosurgical device 112 can also include a heat sink 680 coupled a proximal side of the light source 140. This can help to reduce a temperature of the light source 140 and, thus, the electrosurgical device 112.

In an example, the light source 140, the optical lens 678, and/or the heat sink 680 can be fixedly coupled to the shaft 126. In this arrangement, the electrosurgical electrode 128 and the suction sleeve 675 can be rotatable relative to the light source 140, the optical lens 678, and/or the heat sink 680. For instance, the apertures in the light source 140, the optical lens 678, and/or the heat sink 680 can have a size and/or a shape (e.g., a circle shape) that allows the electrosurgical electrode 128 and the suction sleeve 675 to rotate in the apertures. Additionally, in this arrangement, the light source 140, the optical lens 678, and the heat sink 680 can be telescopically movable together with the shaft 126 relative to the housing 124.

Figure 9:
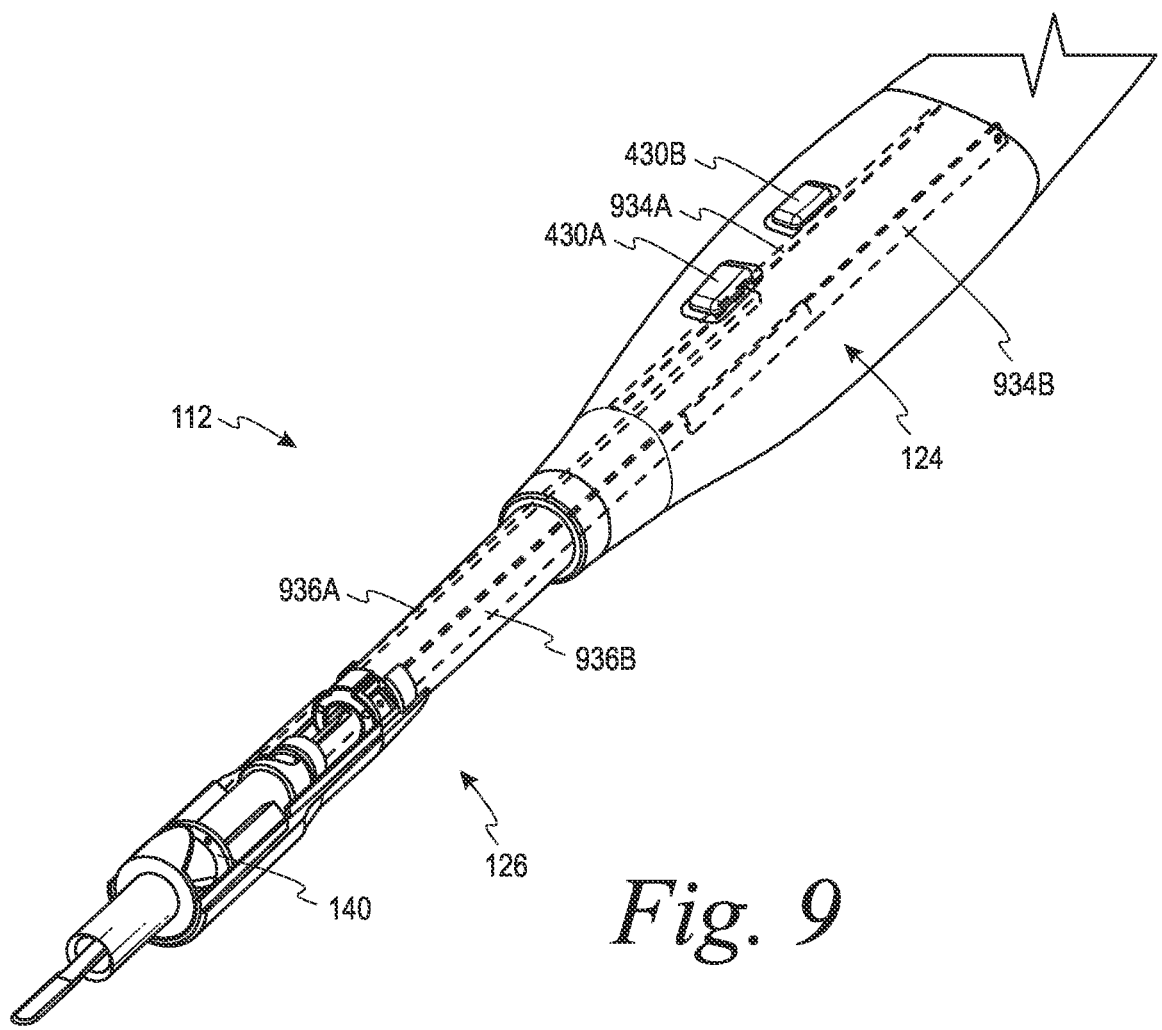
FIG. 9 depicts the electrosurgical device of FIGS. 4A-8 with components removed to show the conductors for supplying the power to a light source, according to an example.

As noted above, the housing conductor 134 and the shaft conductor 136 can provide for electrically coupling the light source 140 to the DC power source 144. FIG. 9 depicts the electrosurgical device 112 of FIGS. 4A-8 with components removed to show the housing conductors 134 and the shaft conductors 136 for supplying the DC power to the light source 140 according to an example. As shown in FIG. 9, the shaft 126 can include a positive-light electrical conductor 936A and a negative-light electrical conductor 936B that slidably engage corresponding electrical conductors 934A, 934B in the housing 124 while the shaft 126 telescopically moves in an axial direction relative to the housing 124.

As shown in FIGS. 4A-5 and 9, the user input device(s) 130 include a first button 430A and a second button 430B on an exterior surface of the housing 124. In one implementation, the first button 430A can be actuated to operate the electrosurgical device 112 in a cutting mode of operation, and the second button 430B can be actuated to operate the electrosurgical device 112 in a coagulation mode of operation. In this example, a third button (not shown) can be provided on the plug of the power cord 122 and/or on the electrosurgical generator 110, and the third button can be actuated to operate the light source 140 (i.e., to cause the light source 140 to emit light or cease emitting light). As described above, the user input device(s) 130 can be configured differently in other examples. For instance, the electrosurgical device 112 can be operable in a lesser quantity of modes of operation, a greater quantity of modes of operation, and/or different types of modes of operation in other examples (e.g., such as the example modes of operation described above). Additionally, for instance, the at least one user input device 130 can additionally or alternatively include the user interface 116 of the electrosurgical generator 110 and/or another external device (e.g., a footswitch) for operating the electrosurgical device 112 in one or more modes of operation. Also, for instance, the user input devices 130 on the housing 124 can include the third button for operating the light source 140.

Figure 10:
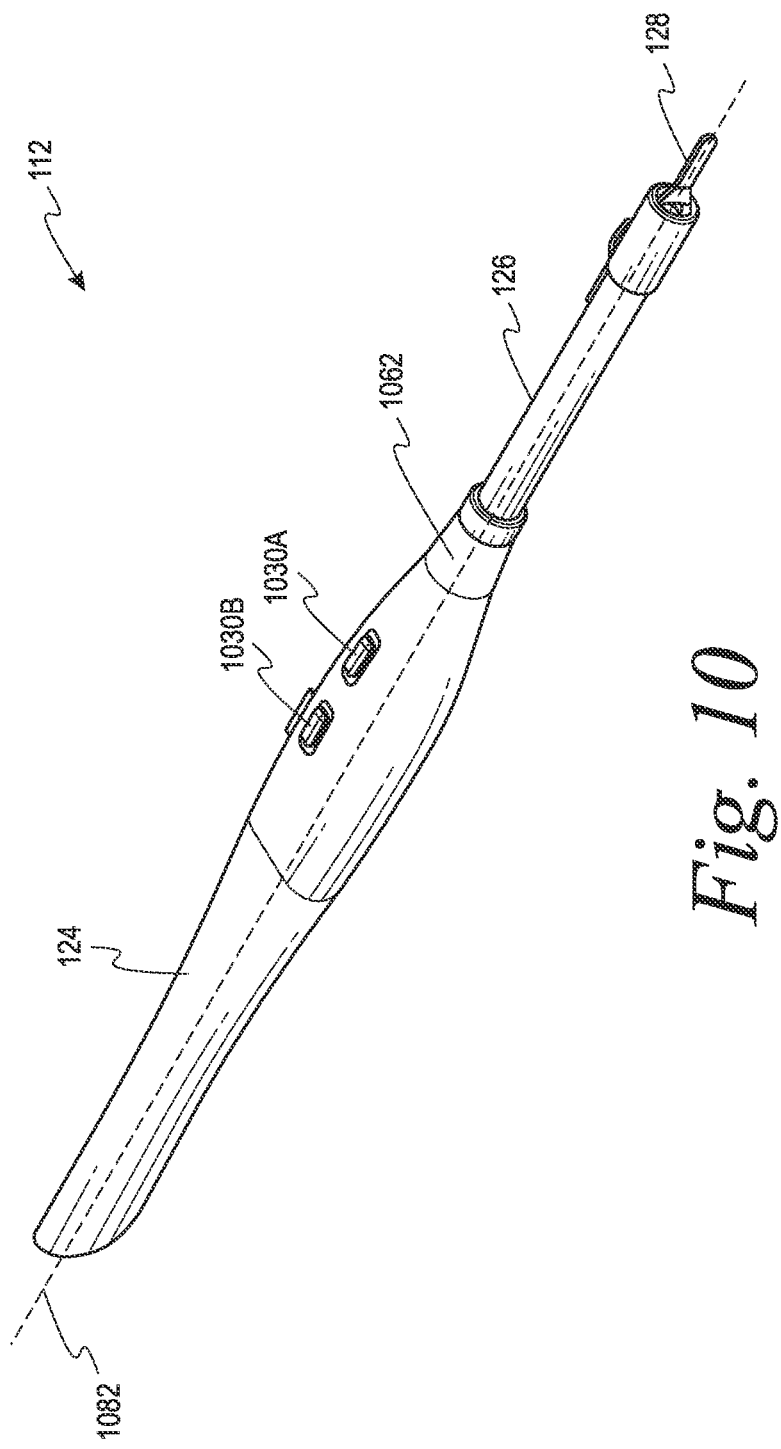
FIG. 10 depicts a perspective view of another implementation of the electrosurgical device of FIG. 1, according to another example.
Figure 11:
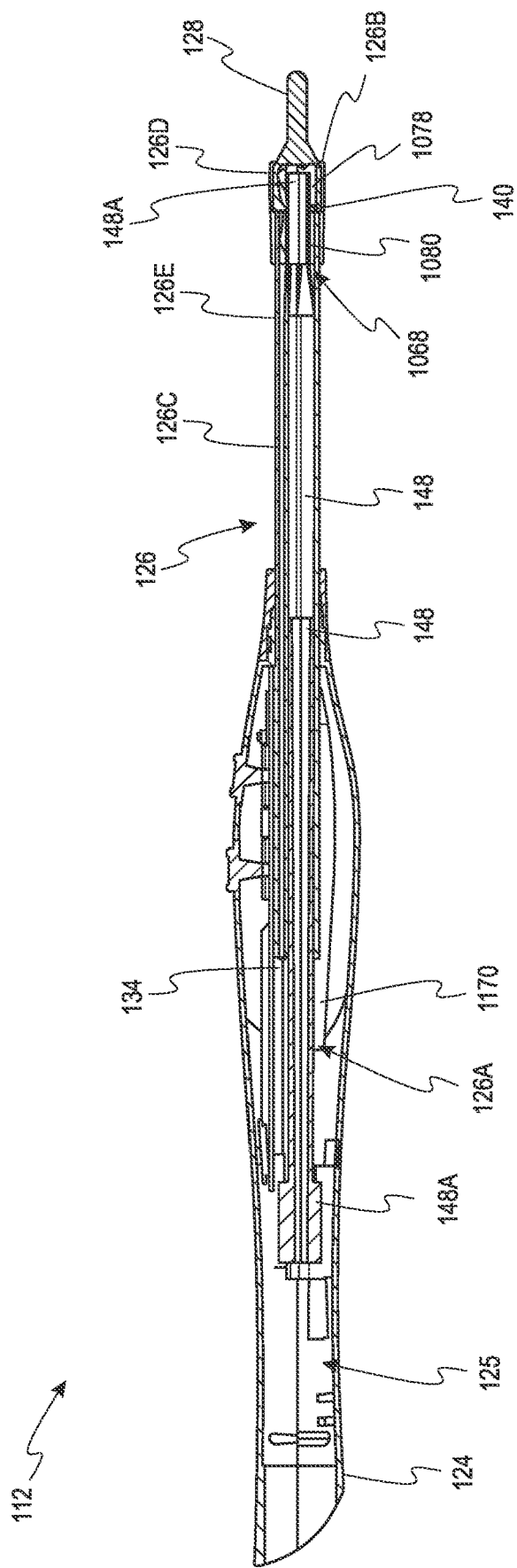
FIG. 11 depicts a cross-sectional view of the electrosurgical device shown in FIG. 10 taken through a longitudinal axis of the electrosurgical device, according to the example.

Referring now to FIGS. 10-15, an implementation of the electrosurgical device 112 is shown according to another example. FIG. 10 depicts a perspective view of the electrosurgical device 112 according to the example. FIG. 11 depicts a cross-sectional view of the electrosurgical device 112 taken through a longitudinal axis 1082 of the electrosurgical device according to the example.

As shown in FIGS. 10-11, the electrosurgical device 112 includes the housing 124 defining an interior bore 125, the shaft 126 extending distally from the interior bore 125 of the housing 124, and a smoke evacuation channel 148 in the inner cavity 1068 of the shaft 126. The shaft 126 has a longitudinal axis 1082 extending between a proximal end 126A of the shaft 126 and a distal end 126B of the shaft 126. Additionally, the electrosurgical electrode 128 extends distally from a distal end 126B of the shaft 126.

In an example, the shaft 126 can be telescopically movable in the interior bore 125 of the housing 124 to adjust a distance of a distalmost tip of the electrosurgical electrode 128 relative to the housing 124. As noted above, telescopically moving the shaft 126 relative to the housing 124 can facilitate adjusting a length of the electrosurgical device to treat differently sized and/or shaped target tissues. However, as described above, the shaft 126 can be fixedly coupled to the housing 124 such that the shaft 126 is not moveable relative to the housing 124 in other examples.

In some examples, the electrosurgical device 112 can include a collar 1062 at a proximal end of the housing 124. The collar 1062 can be rotatable relative to the housing 124 to increase and/or decrease friction between an outer surface of the shaft 126 and an inner surface of the collar 1062. In this way, the collar 1062 to allow and/or inhibit axial telescopic movement of the shaft 126 relative to the housing 124.

Additionally, in FIGS. 10-11, the shaft 126 is rotatable relative to the housing 124, and the smoke evacuation channel 148 is rotationally fixed relative to the housing 124. Additionally, as described in further detail below, the electrosurgical device 112 can further include the light source 140 and an optical lens 1078, which can both be rotationally fixed relative to the housing 124. Providing for rotation of the electrosurgical electrode 128 together with the shaft 126 while rotationally fixing the smoke evacuation 148, the light source 140, and/or the optical lens 1078 can help to simplify the design and/or reduce a cost of manufacture for the electrosurgical device 112.

The rotational arrangement of these components of the electrosurgical device 112 can be achieved, at least in part, as a result of the electrosurgical electrode 128 extending distally from the distal end 126B of the shaft 126 such that (i) the shaft 126 conducts electrosurgical energy to the electrosurgical electrode 128, and (ii) rotation of the shaft 126 relative to the housing 124 causes corresponding rotation of the electrosurgical electrode 128 relative to the housing 124. For example, at least a portion of the shaft 126 can be formed of an electrically conductive material such that the shaft 126 is the shaft conductor 136 for supplying the electrosurgical energy to the electrosurgical electrode 128. In one implementation, the shaft 126 can be entirely formed from the electrically conductive material (e.g., the shaft 126 can be a tubular structure formed from a metal). In another implementation, the shaft 126 can include an electrically conductive portion and an insulator portion so long as the electrically conductive portion is configured to conduct the electrosurgical energy to the electrosurgical electrode 128.

In one example, the electrosurgical electrode 128 and the shaft 126 are formed as a single-part, monolithic structure. This can be beneficial in an implementation in which the electrosurgical electrode 128 is permanently fixed to the shaft 126 such that the electrosurgical electrode 128 cannot be replaced with another electrosurgical electrode 128. In another example, the electrosurgical electrode 128 and the shaft 126 can be separate components that are coupled to each other (e.g., by welding, soldering, and/or a friction fit coupling). In some implementations in which the electrosurgical electrode 128 and the shaft 126 are separate components, the electrosurgical electrode 128 can be removable from the shaft 126 and replaced with another electrosurgical electrode 128. In other implementations, the electrosurgical electrode 128 can be permanently fixed to the shaft 126 such that the electrosurgical electrode 128 cannot be replaced with another electrosurgical electrode 128.

In FIGS. 10-11, the shaft 126 includes an electrically conductive portion 126C and an insulator portion 126D. As noted above, the electrosurgical electrode 128 can extend from the electrically conductive portion 126C of the shaft 126. The insulator portion 126D of the shaft 126 can cover an interface between the electrosurgical electrode 128 and the electrically conductive portion 126C of the shaft 126. In this arrangement, the insulator portion 126D can help to mitigate arcing and/or help to supply the electrosurgical energy to the electrosurgical electrode 128. Additionally, the shaft 126 can include a layer of insulator material 126E covering a remainder of the electrically conductive portion 126C of the shaft 126 (e.g., a portion that is not covered by the insulator portion 126D of the shaft 126) to mitigate arcing and/or help to supply the electrosurgical energy to the electrosurgical electrode 128.

Figure 12:
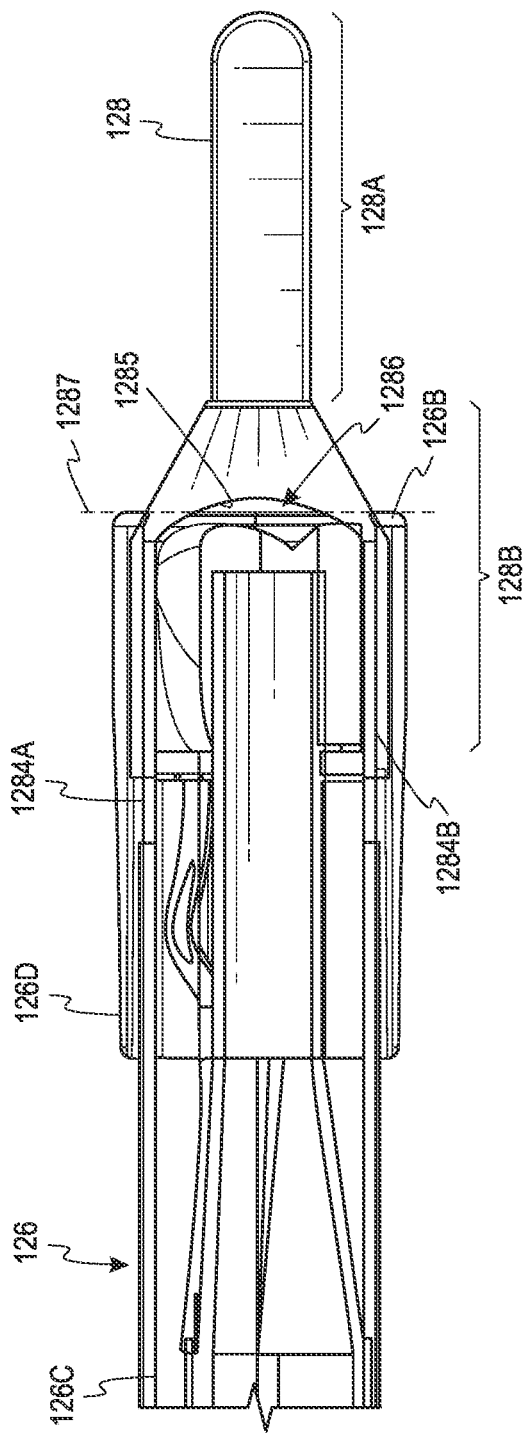
FIG. 12 depicts an enlarged view of the cross-section of a distal end of a shaft and an electrosurgical electrode shown in FIG. 11, according to an example.

Referring now to FIG. 12, an enlarged view of the cross-section of the distal end 126B of the shaft 126 and the electrosurgical electrode 128 taken through the longitudinal axis 1082 is shown according to an example. As shown in FIG. 12, a distal portion 128A of the electrosurgical electrode 128 can define a working end that is configured to apply electrosurgical energy to tissue. A proximal portion 128B of the electrosurgical electrode 128 can include a first leg 1284A extending from a distal end 126B of the shaft 126, and a second leg 1284B extending from the distal end of the conductive portion 126C of the shaft 126.

In FIG. 12, the first leg 1284A and the second leg 1284B are diametrically opposed to each other around a circumference of the distal end 126B of the shaft 126. Additionally, a proximal-facing surface 1285 of the proximal portion 128B of the electrosurgical electrode 128 can taper, along a distal direction, toward a center axis of the shaft 126 to define a gap 1286 between the proximal-facing surface 1285 and a plane 1287 at a distalmost end of the shaft 126. The gap 1286 can help to improve air flow and suction at the distal end 126B of the shaft 126.

Referring back to FIG. 11, the shaft 126 can include an electrical contact 1170 that engages the housing conductor 134 that extends along the housing 124 in a direction parallel to a longitudinal axis 1082 (as shown in FIG. 10) of the housing 124. The electrical contact 1170 can be configured to remain engaged with the housing conductor 134 while the shaft 126 moves telescopically relative to the housing 124. For instance, the electrical contact 1170 is fixedly coupled to the shaft 126 such that the electrical contact 1170 moves with the shaft 126 relative to the housing 124. In this arrangement, the electrical contact 1170 can continuously engage and electrically couple to the housing conductor 134 while the electrical contact 1170 slides along the housing conductor 134 responsive to the shaft 126 moving axially relative to the housing 124.

Additionally, the electrical contact 1170 can extend around a circumference of the shaft 126 such that the electrical contact 1170 can remain engaged with the housing conductor 134 in all rotational positions of the shaft 126 and the electrosurgical electrode 128 relative to the housing 124. In this way, the electrical contact 1170 can facilitate supplying electrosurgical energy tot the electrosurgical electrode 128 in any rotational position and/or in any axial position of the electrosurgical electrode 128 relative to the housing 124.

In one example, the shaft 126 and the electrosurgical electrode 128 can be rotatable by more than 360 degrees relative to the housing 124. In this example, the electrical contact 1170 can extend entirely around the circumference of the shaft 126. In another example, the shaft 126 and the electrosurgical electrode 128 can be rotatable by less than 360 degrees relative to the housing 124. In such an example, the electrical contact 1170 can extend around at least a portion of the circumference of the shaft 126 that is sufficient to maintain the electrical coupling between the shaft 126 and the housing conductor 134 over the entire range of rotational positions that the shaft 126 and the electrosurgical electrode 128 can be in relative to the housing 124.

As noted above, the electrosurgical electrode 128 can include a proximal portion 128B extending from the distal end of the shaft 126, and a distal portion 128A that comprises a working end configured to apply electrosurgical energy to tissue. In FIGS. 10-12, a center axis of the distal portion 128A of the electrosurgical electrode 128 and a center axis of the smoke evacuation channel 148 are collinear. In this arrangement, the smoke evacuation channel 148 can have a substantially constant size around a circumference of the electrosurgical electrode 128. This can help to provide relatively consistent suction each point around the electrosurgical electrode 128. However, in other examples, the center axes of the electrosurgical electrode 128 and the shaft 126 can be offset and parallel relative to each other.

Additionally, as shown in FIGS. 10-12, the smoke evacuation channel 148 can define a space that is void of any other structure between a proximal end 148A of the smoke evacuation channel 148 and a distal end 148B of the smoke evacuation channel 148. This can provide for more efficiently using the relatively limited size of the inner cavity 1068 to enhance suction via the smoke evacuation channel 148 as compared to other implementations in which the electrosurgical electrode 128 and/or other components are disposed in the smoke evacuation channel 148.

Figure 13:
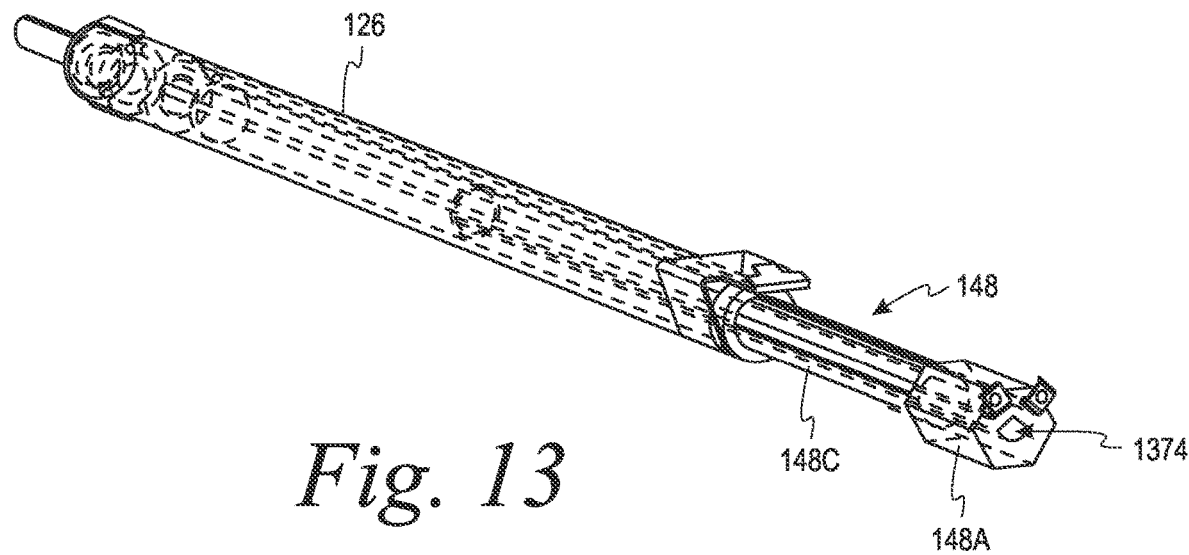
FIG. 13 depicts a perspective view of a smoke evacuation channel and a shaft of the electrosurgical device shown in FIGS. 10-12, according to an example.
Figure 14:
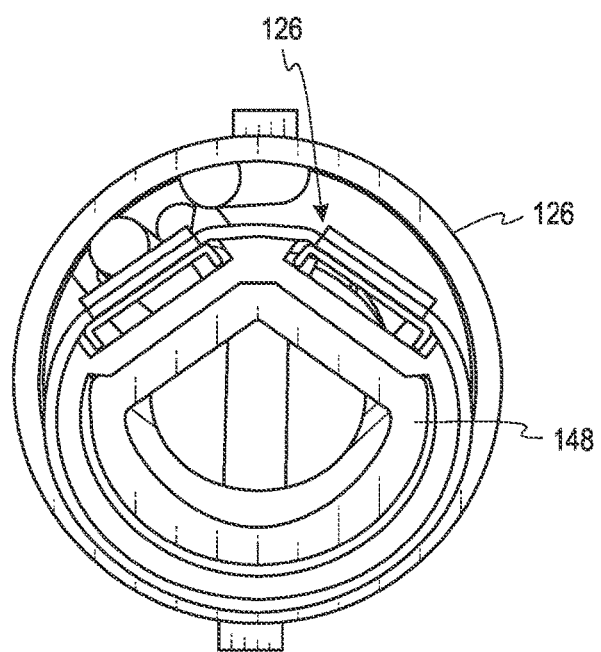
FIG. 14 depicts a side view of the smoke evacuation channel and the shaft of the electrosurgical device shown in FIGS. 10-12, according to an example.

Additionally, as noted above, the smoke evacuation channel 148 can be rotationally fixed relative to the housing 124 such that the shaft 126 and the electrosurgical electrode 128 are rotatable relative to the smoke evacuation channel 148. FIGS. 13-14 depict the smoke evacuation channel 148 and the shaft 126 according to an example. As shown in FIGS. 11 and 13-14, at least a portion of the smoke evacuation channel 148 can have a non-circular shape to inhibit rotation of the smoke evacuation channel 148 relative to the housing 124 while the shaft 126 and the electrosurgical electrode 128 rotate relative to the housing 124.

For example, the proximal end 148A of the smoke evacuation channel 148 can include a non-rotational fitting that is configured to engage with a correspondingly shaped structure in the housing 124, and the non-rotational fitting can have a non-circular cross-sectional shape. In FIGS. 11 and 13, for example, the proximal end 148A of the smoke evacuation channel 148 has a hexagonal feature that engages a hexagonally shaped socket formed in an interior wall of the housing 124 to prevent rotation between the smoke evacuation channel 148 and the housing 124. Additionally, as shown in FIG. 14, a gap can be defined between the shaft 126 and the smoke evacuation channel 148 to provide for rotation of the shaft 126 relative to the smoke evacuation channel 148.

As shown in FIG. 13, the non-rotational fitting at the proximal end 148A of the smoke evacuation channel 148 can include a through-bore 1374 that has a cross-sectional area that is less than a cross-sectional area of a body 148C of the smoke evacuation channel 148, which is proximal of the non-rotational fitting. The relatively smaller size of the through-bore 1374 can assist in directing the smoke into a relatively smaller volume of space as the smoke exits the proximal end 148A of the smoke evacuation channel 148. This can beneficially help to reduce or prevent exposing electrical components in the interior bore 125 of the housing 124 to the smoke.

Figure 15:
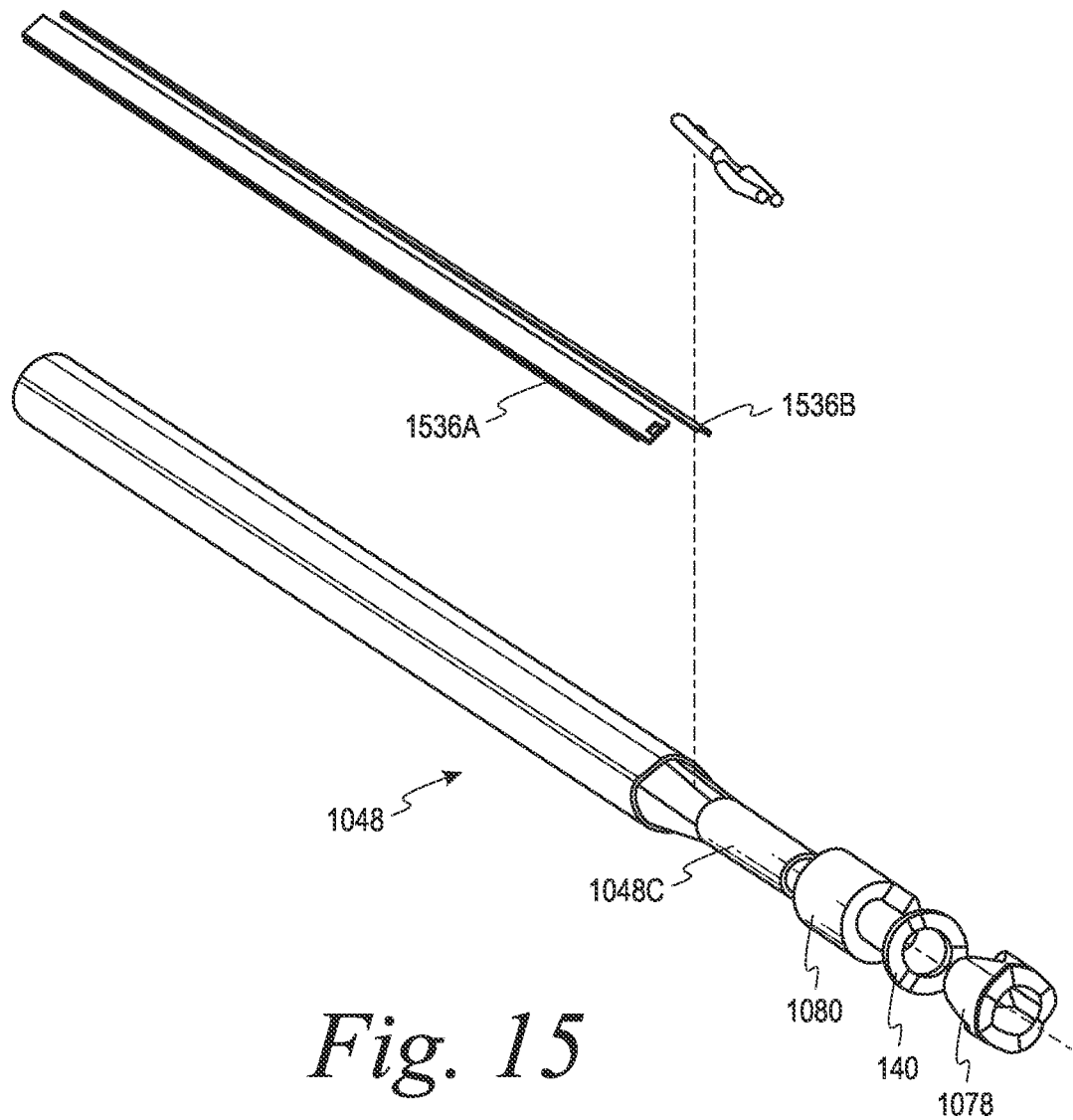
FIG. 15 depicts a partially exploded view of an assembly of a light source, an optical lens, and a heat sink on the smoke evacuation channel of the electrosurgical device shown in FIGS. 10-12, according to an example.

As shown in FIG. 11, the electrosurgical device 112 can also include the light source 140, an optical lens 1178, and/or a heat sink 1180. As shown in FIGS. 11 and 15, the light source 140 can be in the inner cavity 1068 of the shaft 126. As noted above, the light source 140 is configured to emit light in a direction toward a distal end 126B of the shaft 126.

FIG. 15 depicts a partially exploded view of an assembly of the light source 140, the optical lens 1078, and the heat sink 1080 on the smoke evacuation channel 148 according to an example. In this example, the light source 140 is a LED PCB that includes three light sources (e.g., LEDs) equally spaced from each other around a circumference of the electrosurgical electrode 128. Providing at least three light sources arranged around the circumference of the electrosurgical electrode 128 can help to mitigate shadows and provide greater uniformity of illumination in all rotational alignments of the electrosurgical electrode 128 relative to the housing 124 and/or the electrosurgical device 112 relative to the target tissue. Although the light source 140 includes three light sources in FIGS. 11 and 15, the light source 140 can include a different quantity of light sources in other examples.

Additionally, as noted above, the optical lens 1078 can be configured to transmit the light from the light source 140 in a distal direction and emit the light from the distal end 126B of the shaft 126. As an example, the optical lens 1078 can include three parabolic lenses and each parabolic lens can be aligned with a respective one of the light sources. The parabolic lenses of the optical lens 1078 can be configured to direct off-axis light (e.g., light that is transverse to the longitudinal axis of the shaft 126) toward the distal end 126B of the shaft 126. In other examples, the electrosurgical device 112 can include another optical structure 142 in additional or alternative to the optical lens 1078, as described above. Alternatively, the electrosurgical device 112 can omit the optical structure 142, as described above.

As shown in FIG. 15, the smoke evacuation channel 148 can extend through an aperture in the optical lens 1067 and an aperture in the light source 140. This can help to locate the smoke evacuation channel 148 at a center of the shaft 126 (e.g., the center axis of the smoke evacuation channel 148 and the center axis of the shaft 126 can be collinear), which can enhance suction at the surgical site. Additionally, this can help to distribute the light around the entire circumference of the electrosurgical electrode 128, which can help to mitigate shadows and provide greater uniformity of illumination in all rotational alignments of the electrosurgical electrode 128 relative to the housing 124 and/or the electrosurgical device 112 relative to the target tissue.

In an example, the light source 140, the optical lens 1078, and/or the heat sink 1080 can be fixedly coupled to the housing 124. In this arrangement, the shaft 126 and the electrosurgical electrode 128 can rotate about the light source 140, the optical lens 1078, and/or the heat sink 1080. For instance, the light source 140, the optical lens 1078, and/or the heat sink 1080 can have a non-circular shape that can engage with a non-circular shape of the body 148C of the smoke evacuation channel 148 to inhibit rotation of the light source 140, the optical lens 1078, and/or the heat sink 1080 relative to the housing 124 while the shaft 126 and the electrosurgical electrode 128 rotate relative to the housing 124. In FIG. 15, the non-circular shape is an oval shape. However, the light source 140, the optical lens 1078, the heat sink 1080, and/or the smoke evacuation channel 148 can have other non-circular shapes in other examples.

Additionally, in this arrangement, the light source 140, the optical lens 678, and the heat sink 680 can be telescopically movable together with the shaft 126 relative to the housing 124. As noted above, the housing conductor 134 and the shaft conductor 136 can provide for electrically coupling the light source 140 to the DC power source 144 during such telescopic movement. As shown in FIG. 15, the shaft 126 can include a positive-light electrical conductor 1536A and a negative-light electrical conductor 1536B that slidably engage corresponding electrical conductors in the housing 124 while the shaft 126 telescopically moves in an axial direction relative to the housing 124.

Figure 16:
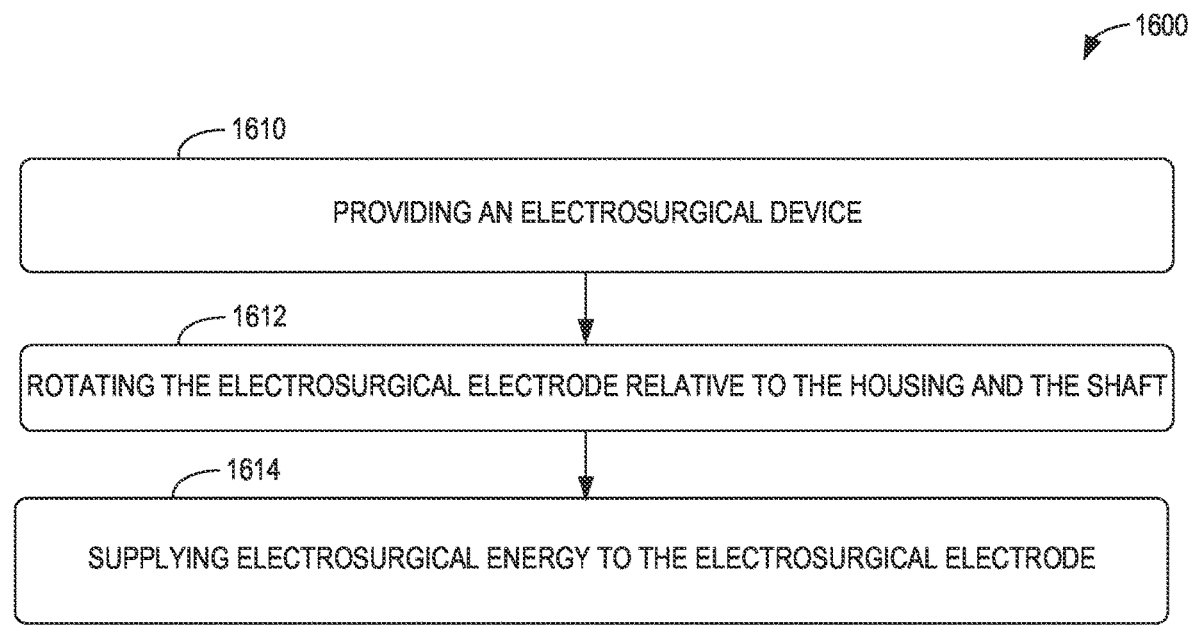
FIG. 16 illustrates a flow chart of an example process for operating an electrosurgical device, according to an example.

Referring now to FIG. 16, a flowchart of a process 1600 of operating an electrosurgical device is shown according to an example. As shown in FIG. 16, at block 1610, the process 1600 includes providing an electrosurgical device. The electrosurgical device includes a housing defining an interior bore, a shaft coupled to the housing, and an electrosurgical electrode coupled to the shaft. The shaft extends distally from the interior bore of the housing. The shaft is rotationally fixed relative to the housing. The shaft includes a smoke evacuation channel extending from a proximal end of the shaft to a distal end of the shaft. A distal portion of the electrosurgical electrode extends distally from the shaft. The electrosurgical electrode is rotatable relative to the housing and the shaft.

At block 1612, the process 1600 includes rotating the electrosurgical electrode relative to the housing and the shaft. At block 1614, the process 1600 can include supplying electrosurgical energy to the electrosurgical electrode.

Figure 17:
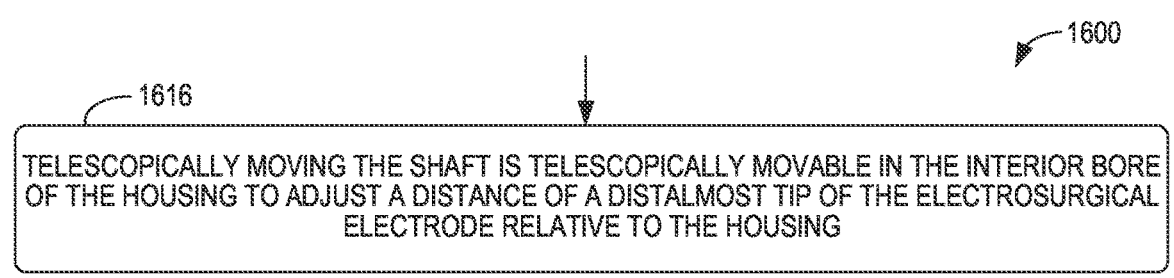
FIG. 17 illustrates a flow chart of an example process for operating an electrosurgical device that can be used with at least the process shown in FIG. 16.

FIGS. 17-30 depict additional aspects of the process 1600 according to further examples. As shown in FIG. 17, the process 1600 can include telescopically moving the shaft is telescopically movable in the interior bore of the housing to adjust a distance of a distalmost tip of the electrosurgical electrode relative to the housing at block 1616.

Figure 18:
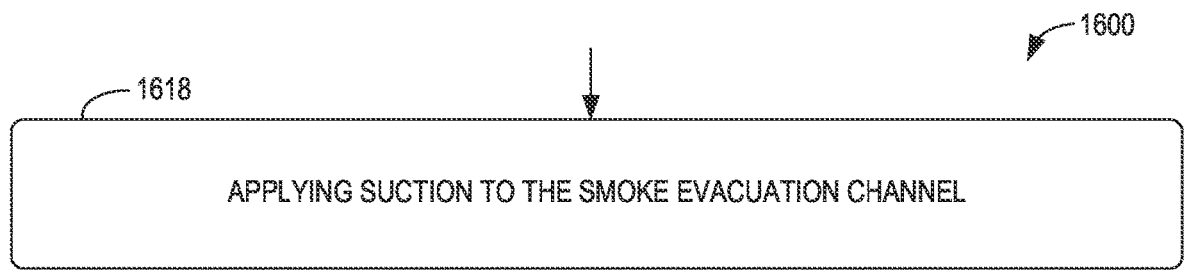
FIG. 18 illustrates a flow chart of an example process for operating an electrosurgical device that can be used with at least the process shown in FIG. 16.

In the example shown in FIG. 18, the electrosurgical device further includes a suction sleeve fluidly coupled to the smoke evacuation channel, a distal portion of the suction sleeve extends distally from the distal end of the shaft, and the electrosurgical electrode extends through the suction sleeve. As shown in FIG. 18, the process 1600 can include applying suction to the smoke evacuation channel at block 1618.

Figure 19:
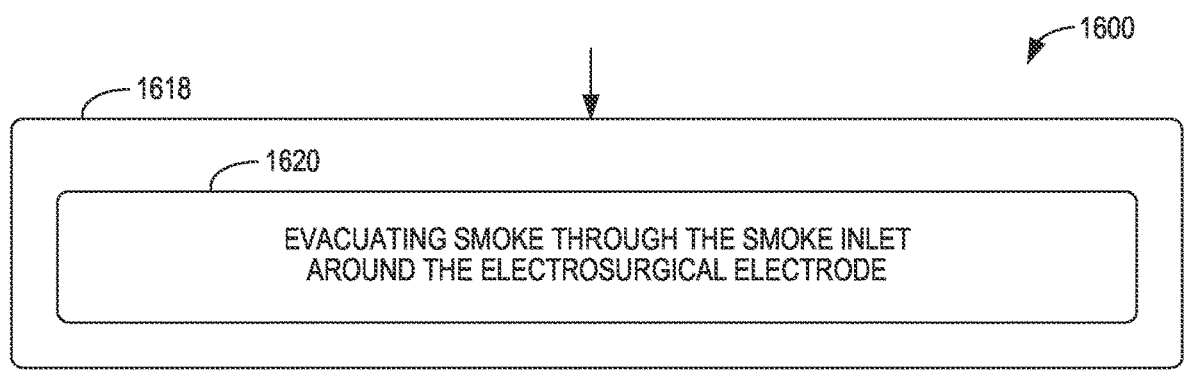
FIG. 19 illustrates a flow chart of an example process for operating an electrosurgical device that can be used with at least the process shown in FIG. 16.

In the example shown in FIG. 19, the suction sleeve is spaced apart from the electrosurgical electrode to define a smoke inlet that can extend circumferentially around a center axis of the distal portion of the electrosurgical electrode. As shown in FIG. 19, applying suction to the smoke evacuation channel at block 1618 can include evacuating smoke through the smoke inlet around the electrosurgical electrode at block 1620.

Figure 20:
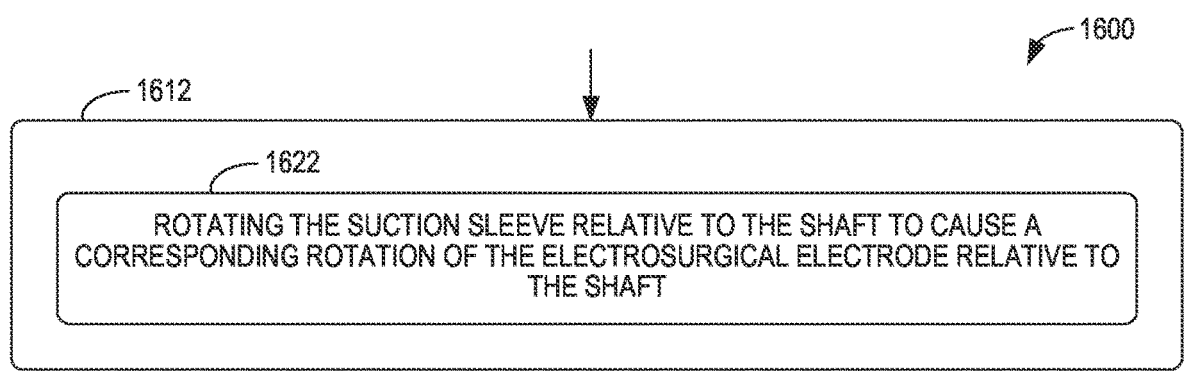
FIG. 20 illustrates a flow chart of an example process for operating an electrosurgical device that can be used with at least the process shown in FIG. 16.

In the example shown in FIG. 20, the suction sleeve is rotationally fixed relative to the electrosurgical electrode. As shown in FIG. 20, rotating the electrosurgical electrode relative to the housing and the shaft at block 1612 can include rotating the suction sleeve relative to the shaft to cause a corresponding rotation of the electrosurgical electrode relative to the shaft at block 1622.

Figure 21:
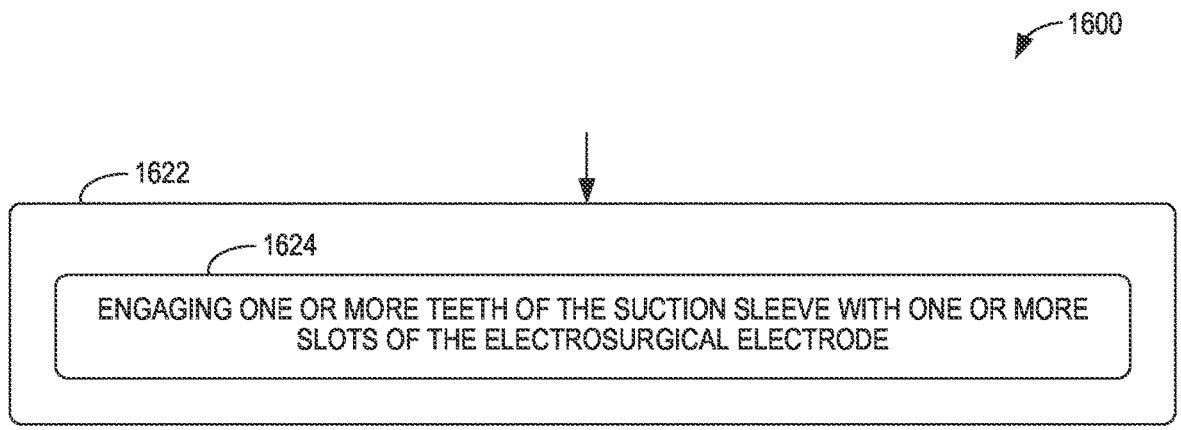
FIG. 21 illustrates a flow chart of an example process for operating an electrosurgical device that can be used with at least the process shown in FIG. 16.

As shown in FIG. 21, rotating the suction sleeve relative to the shaft at block 1622 can include engaging one or more teeth of the suction sleeve with one or more slots of the electrosurgical electrode at block 1624.

Figure 22:
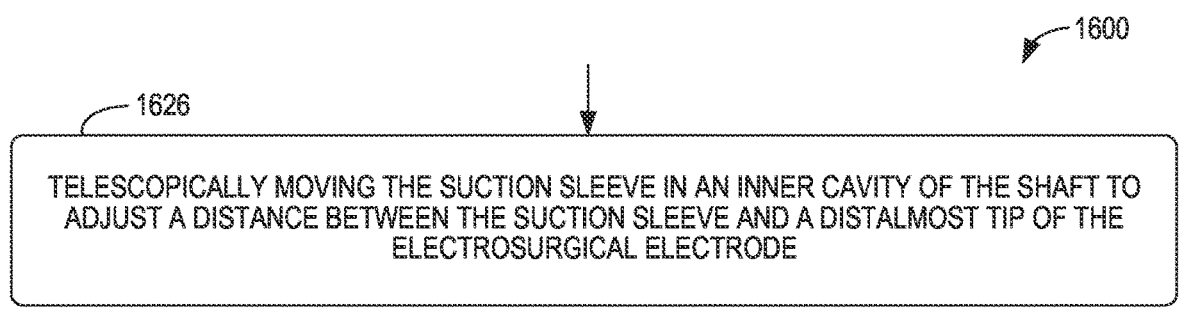
FIG. 22 illustrates a flow chart of an example process for operating an electrosurgical device that can be used with at least the process shown in FIG. 16.

As shown in FIG. 22, the process 1600 can include telescopically moving the suction sleeve in an inner cavity of the shaft to adjust a distance between the suction sleeve and a distalmost tip of the electrosurgical electrode at block 1626.

Figure 23:
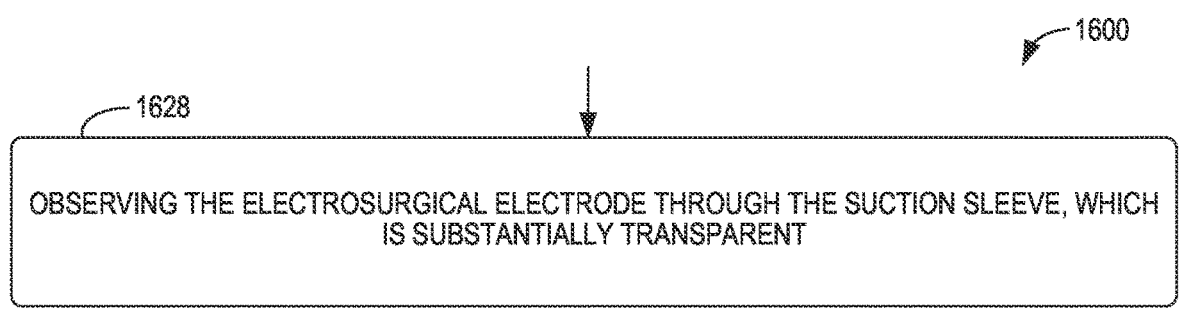
FIG. 23 illustrates a flow chart of an example process for operating an electrosurgical device that can be used with at least the process shown in FIG. 16.

As shown in FIG. 23, the process 1600 can include observing the electrosurgical electrode through the suction sleeve, which is substantially transparent at block 1628.

Figure 24:
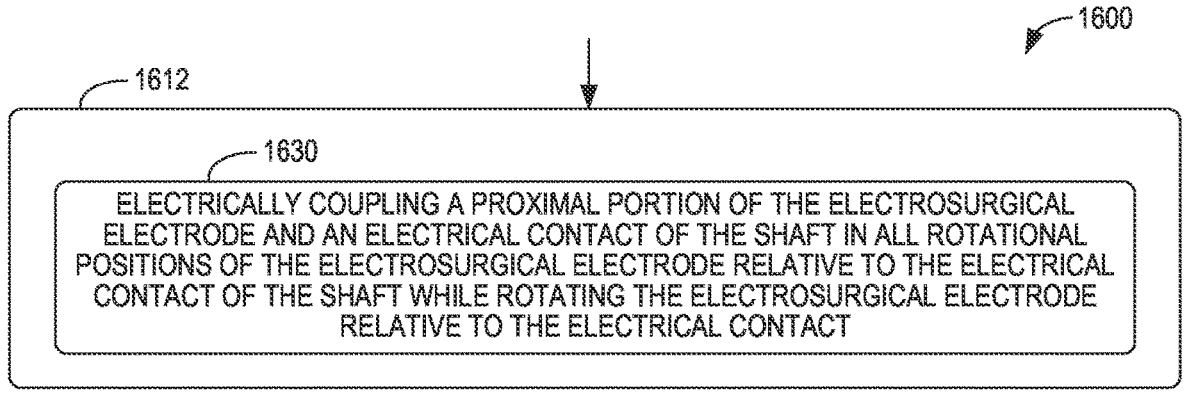
FIG. 24 illustrates a flow chart of an example process for operating an electrosurgical device that can be used with at least the process shown in FIG. 16.

As shown in FIG. 24, rotating the electrosurgical electrode relative to the housing and the shaft at block 1612 can include electrically coupling a proximal portion of the electrosurgical electrode and an electrical contact of the shaft in all rotational positions of the electrosurgical electrode relative to the electrical contact of the shaft while rotating the electrosurgical electrode relative to the electrical contact at block 1630.

Figure 25:
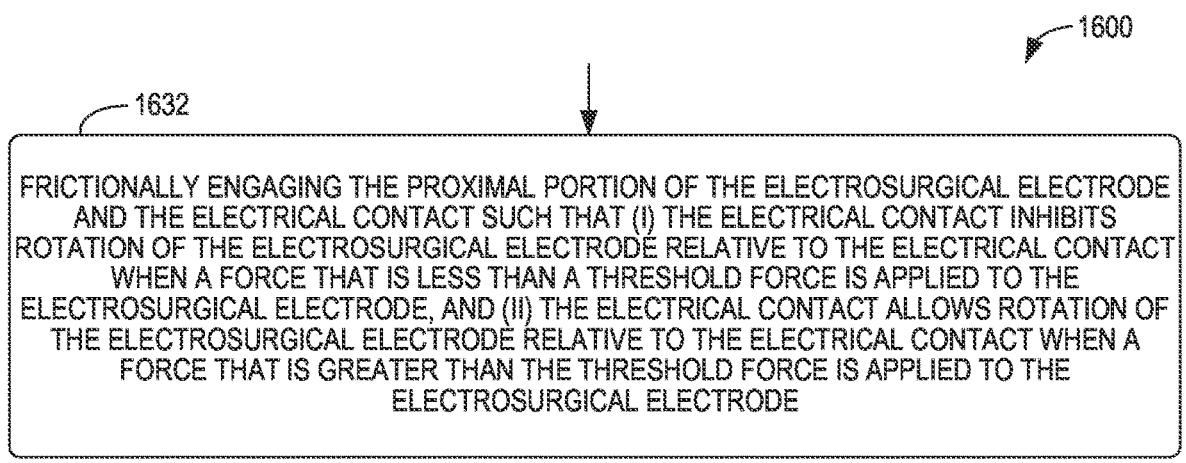
FIG. 25 illustrates a flow chart of an example process for operating an electrosurgical device that can be used with at least the process shown in FIG. 16.

As shown in FIG. 25, the process 1600 can include, at block 1632, frictionally engaging the proximal portion of the electrosurgical electrode and the electrical contact such that (i) the electrical contact inhibits rotation of the electrosurgical electrode relative to the electrical contact when a force that is less than a threshold force is applied to the electrosurgical electrode, and (ii) the electrical contact allows rotation of the electrosurgical electrode relative to the electrical contact when a force that is greater than the threshold force is applied to the electrosurgical electrode.

Figure 26:
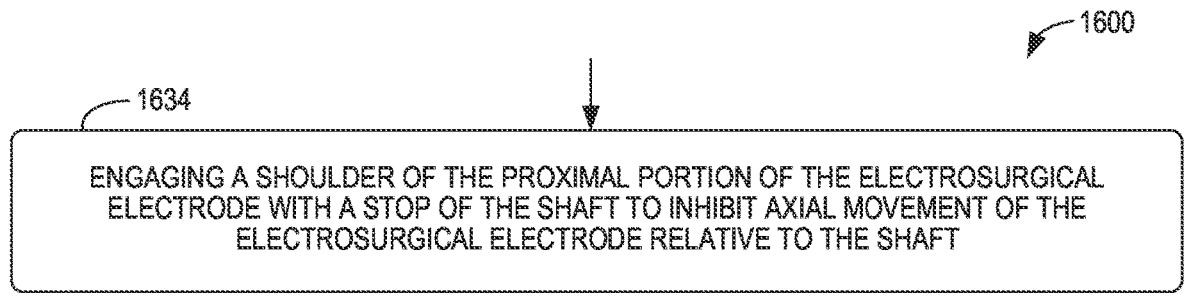
FIG. 26 illustrates a flow chart of an example process for operating an electrosurgical device that can be used with at least the process shown in FIG. 16.

As shown in FIG. 26, the process 1600 can include engaging a shoulder of the proximal portion of the electrosurgical electrode with a stop of the shaft to inhibit axial movement of the electrosurgical electrode relative to the shaft at block 1634.

Figure 27:
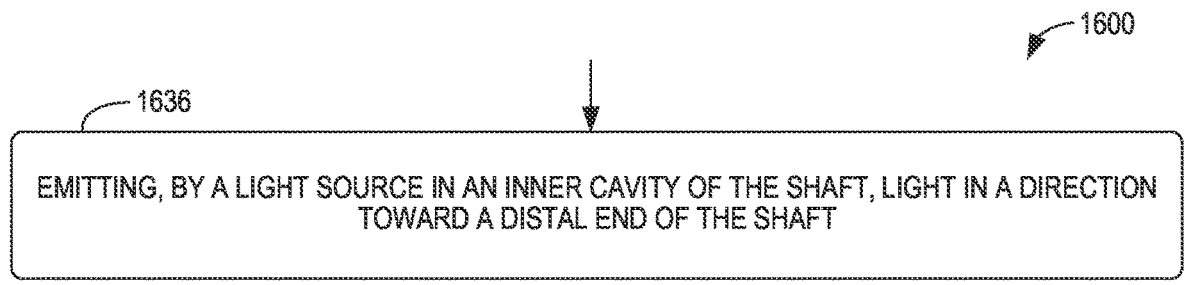
FIG. 27 illustrates a flow chart of an example process for operating an electrosurgical device that can be used with at least the process shown in FIG. 16.

As shown in FIG. 27, the process 1600 can include emitting, by a light source in an inner cavity of the shaft, light in a direction toward a distal end of the shaft at block 1636.

Figure 28:
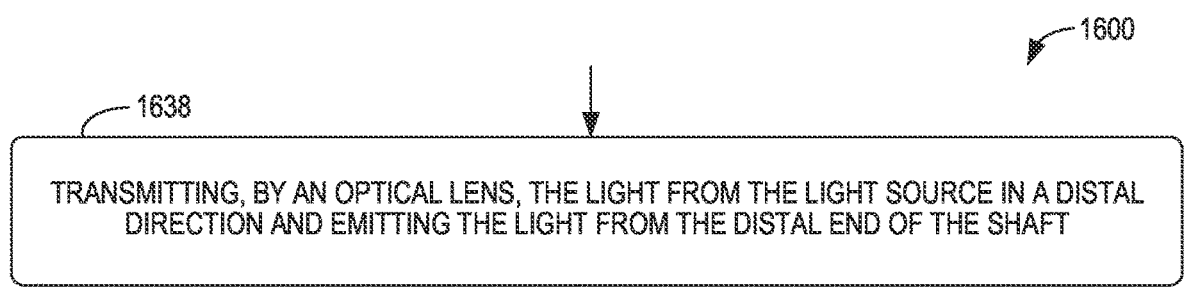
FIG. 28 illustrates a flow chart of an example process for operating an electrosurgical device that can be used with at least the process shown in FIG. 16.

As shown in FIG. 28, the process 1600 can include transmitting, by an optical lens, the light from the light source in a distal direction and emitting the light from the distal end of the shaft at block 1638. The electrosurgical electrode can extend through an aperture in the optical lens and an aperture in the light source.

Figure 29:
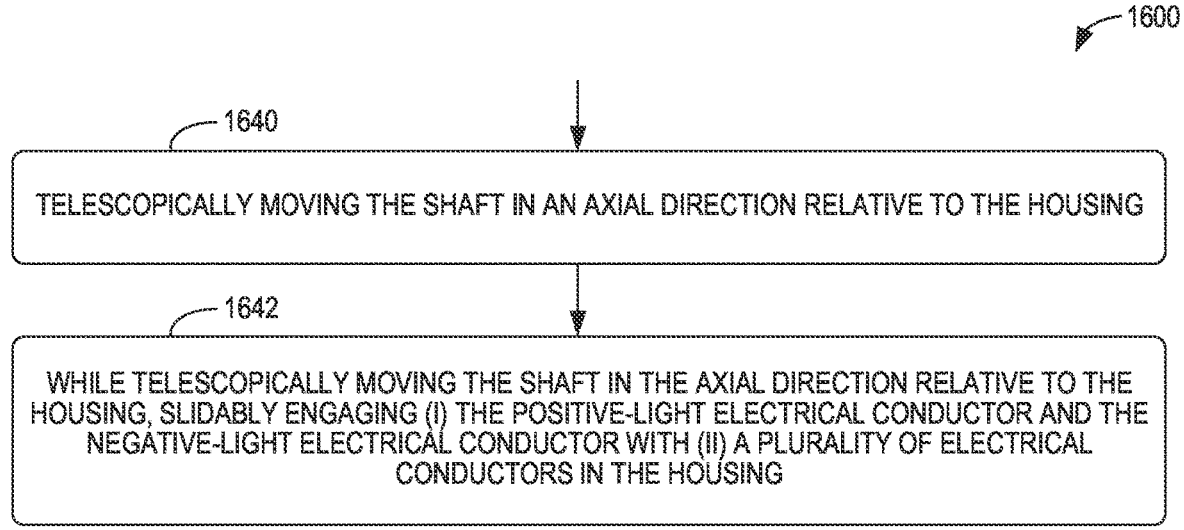
FIG. 29 illustrates a flow chart of an example process for operating an electrosurgical device that can be used with at least the process shown in FIG. 16.

As shown in FIG. 29, the process 1600 can include telescopically moving the shaft in an axial direction relative to the housing, wherein the shaft comprises a positive-light electrical conductor and a negative-light electrical conductor at block 1640. Also, in FIG. 29, the process 1600 can include, while telescopically moving the shaft in the axial direction relative to the housing, slidably engaging (i) the positive-light electrical conductor and the negative-light electrical conductor with (ii) a plurality of electrical conductors in the housing at block 1642.

Figure 30:
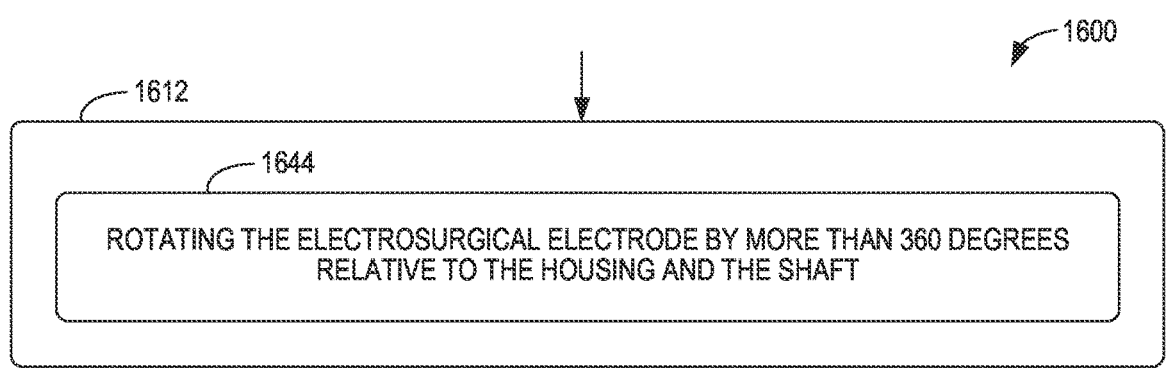
FIG. 30 illustrates a flow chart of an example process for operating an electrosurgical device that can be used with at least the process shown in FIG. 16.

As shown in FIG. 30, rotating the electrosurgical electrode relative to the housing and the shaft at block 1612 can include rotating the electrosurgical electrode by more than 360 degrees relative to the housing and the shaft at block 1644.

Figure 31:
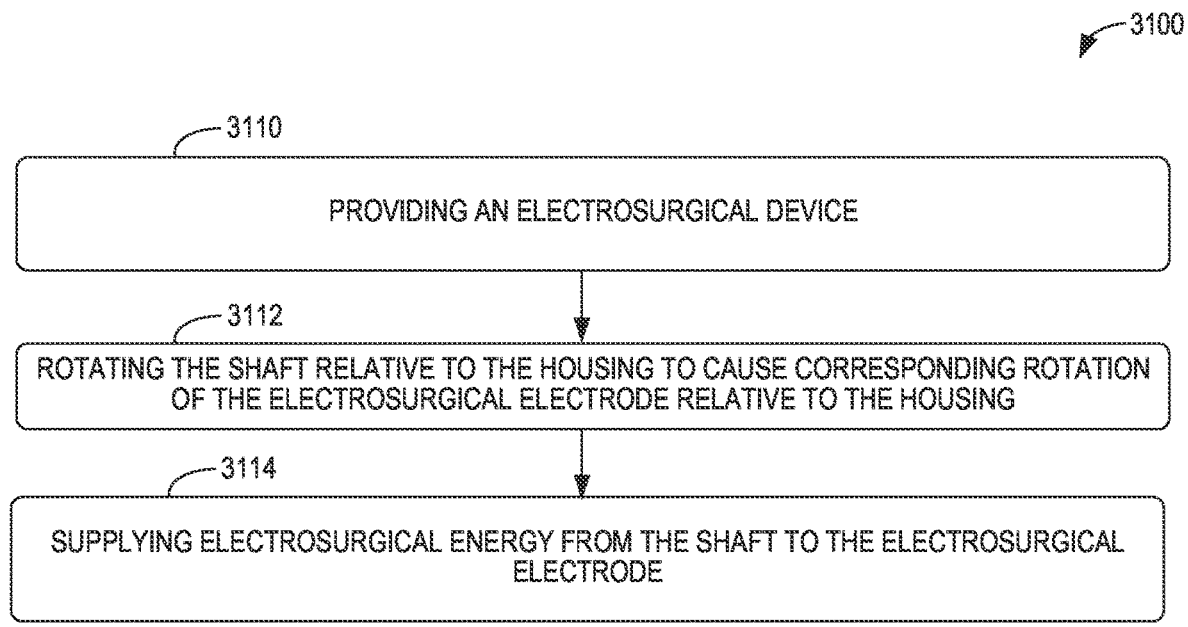
FIG. 31 illustrates a flow chart of an example process for operating an electrosurgical device, according to another example.

Referring now to FIG. 31, a flowchart of a process 3100 of operating an electrosurgical device is shown according to another example. As shown in FIG. 31, the process 3100 can include, at block 3110, providing an electrosurgical device. The electrosurgical device includes a housing defining an interior bore, a shaft extending distally from the interior bore of the housing, a smoke evacuation channel in an inner cavity of the shaft, and an electrosurgical electrode extending distally from the distal end of the shaft. The shaft is rotatable relative to the housing. The shaft has a longitudinal axis extending between a proximal end of the shaft and a distal end of the shaft. The smoke evacuation channel is rotationally fixed relative to the housing. The electrosurgical electrode is electrically coupled to the shaft.

The process 3100 also includes rotating the shaft relative to the housing to cause corresponding rotation of the electrosurgical electrode relative to the housing at block 3112. The process 3100 can further include supplying electrosurgical energy from the shaft to the electrosurgical electrode at block 3114.

Figure 32:
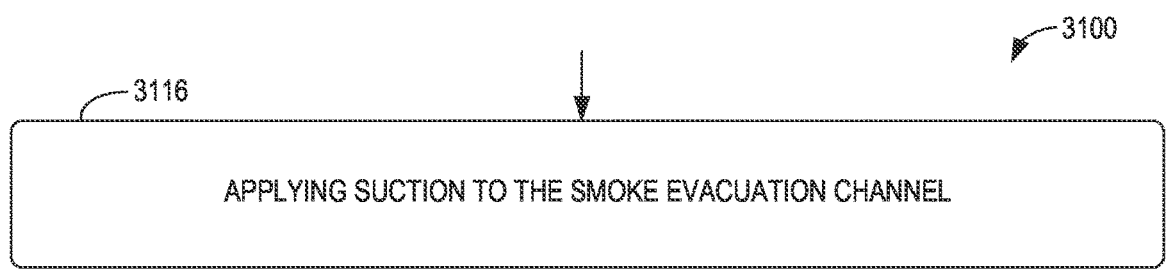
FIG. 32 illustrates a flow chart of an example process for operating an electrosurgical device that can be used with at least the process shown in FIG. 31.

FIGS. 32-40 depict additional aspects of the process 3100 according to further examples. As shown in FIG. 32, the process 3100 can include applying suction to the smoke evacuation channel at block 3116.

Figure 33:
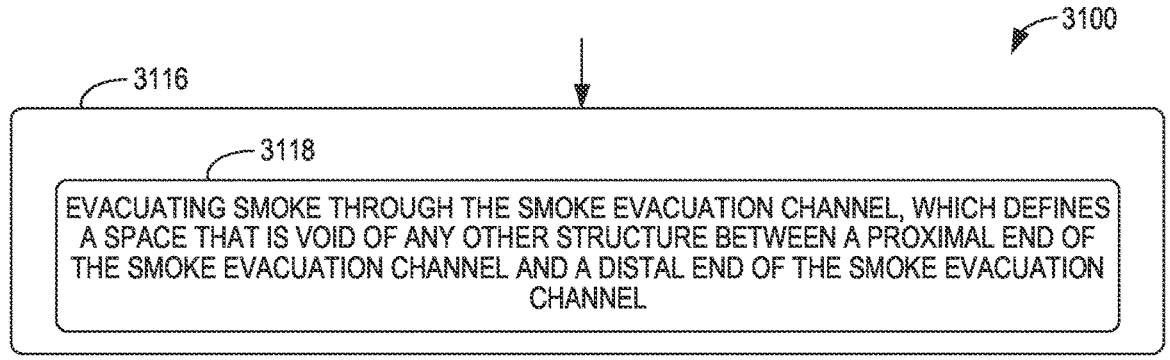
FIG. 33 illustrates a flow chart of an example process for operating an electrosurgical device that can be used with at least the process shown in FIG. 31.

As shown in FIG. 33, applying suction to the smoke evacuation channel at block 3116 can include evacuating smoke through the smoke evacuation channel, which defines a space that is void of any other structure between a proximal end of the smoke evacuation channel and a distal end of the smoke evacuation channel at block 3118.

Figure 34:
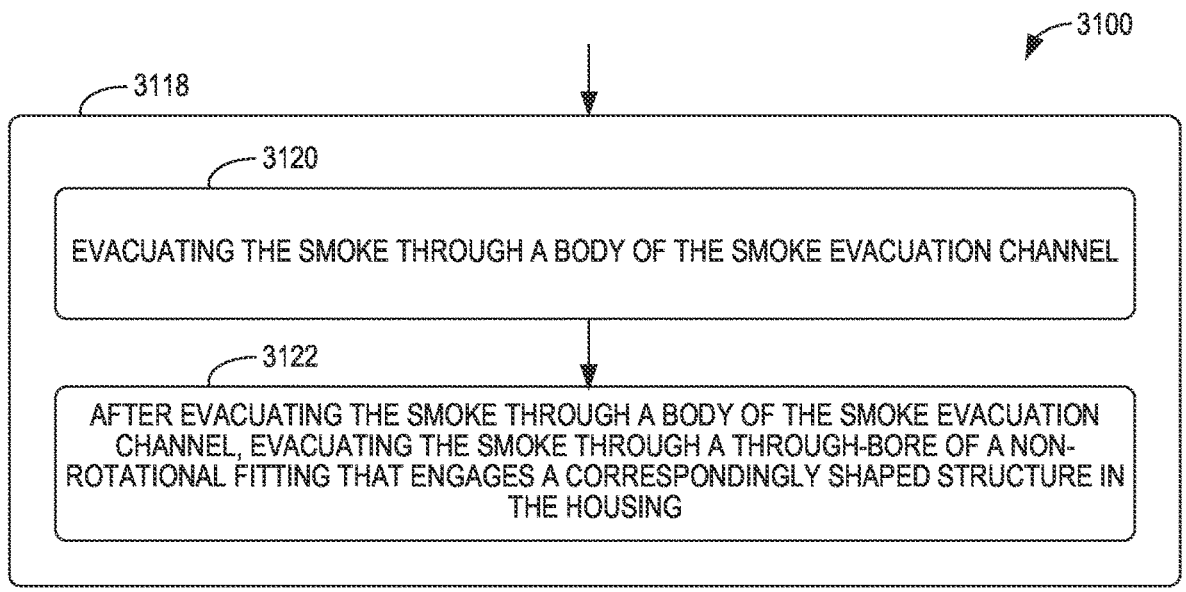
FIG. 34 illustrates a flow chart of an example process for operating an electrosurgical device that can be used with at least the process shown in FIG. 31.

As shown in FIG. 34, evacuating the smoke through the smoke evacuation channel at block 3118 can include: (i) evacuating the smoke through a body of the smoke evacuation channel at block 3120, and (ii) after evacuating the smoke through a body of the smoke evacuation channel at block 3120, evacuating the smoke through a through-bore of a non-rotational fitting that engages a correspondingly shaped structure in the housing at block 3122. In FIG. 34, the through-bore can have a cross-sectional area that is less than a cross-sectional area of the body of the smoke evacuation channel, which is proximal of the non-rotational fitting.

Figure 35:
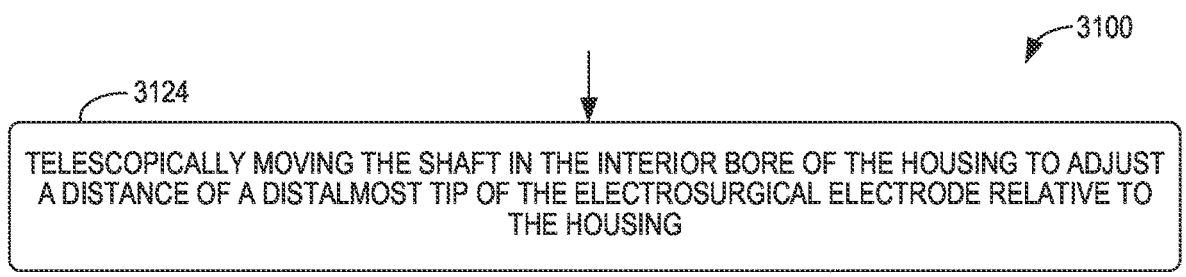
FIG. 35 illustrates a flow chart of an example process for operating an electrosurgical device that can be used with at least the process shown in FIG. 31.

As shown in FIG. 35, the process 3100 can include telescopically moving the shaft in the interior bore of the housing to adjust a distance of a distalmost tip of the electrosurgical electrode relative to the housing at block 3124.

Figure 36:
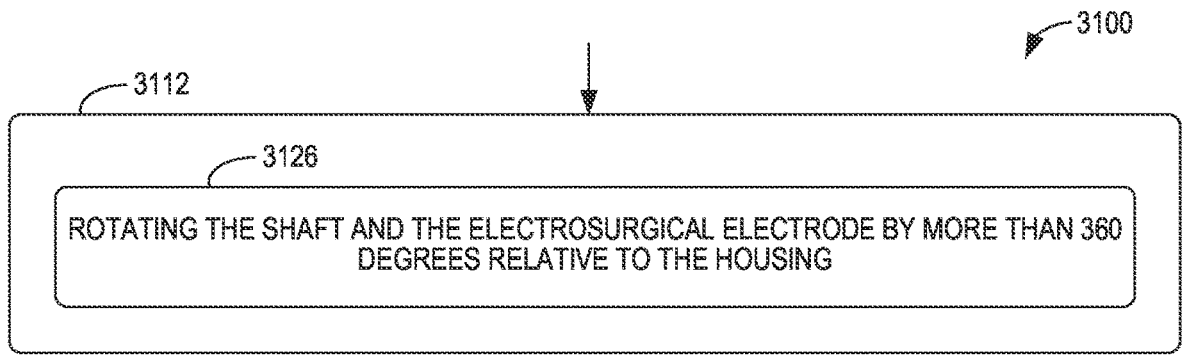
FIG. 36 illustrates a flow chart of an example process for operating an electrosurgical device that can be used with at least the process shown in FIG. 31.

As shown in FIG. 36, rotating the shaft relative to the housing to cause corresponding rotation of the electrosurgical electrode relative to the housing at block 3112 can include rotating the shaft and the electrosurgical electrode by more than 360 degrees relative to the housing at block 3126.

Figure 37:
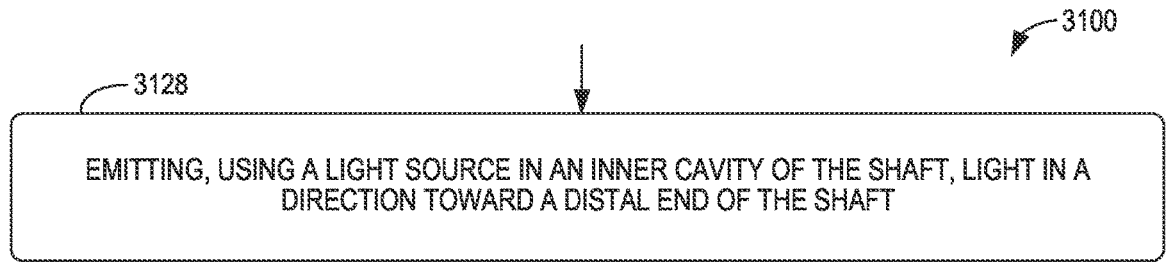
FIG. 37 illustrates a flow chart of an example process for operating an electrosurgical device that can be used with at least the process shown in FIG. 31.

As shown in FIG. 37, the process 3100 can include emitting, using a light source in an inner cavity of the shaft, light in a direction toward a distal end of the shaft at block 3128.

Figure 38:
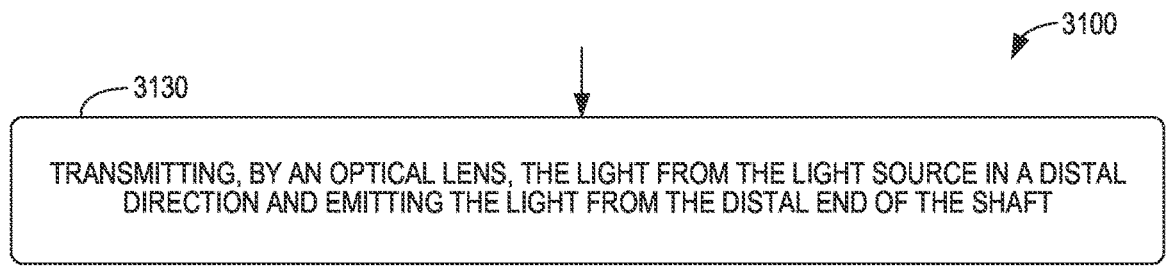
FIG. 38 illustrates a flow chart of an example process for operating an electrosurgical device that can be used with at least the process shown in FIG. 31.

As shown in FIG. 38, the process 3100 can include transmitting, by an optical lens, the light from the light source in a distal direction and emitting the light from the distal end of the shaft at block 3130. In FIG. 38, the smoke evacuation channel can extend through an aperture in the optical lens and an aperture in the light source.

Figure 39:
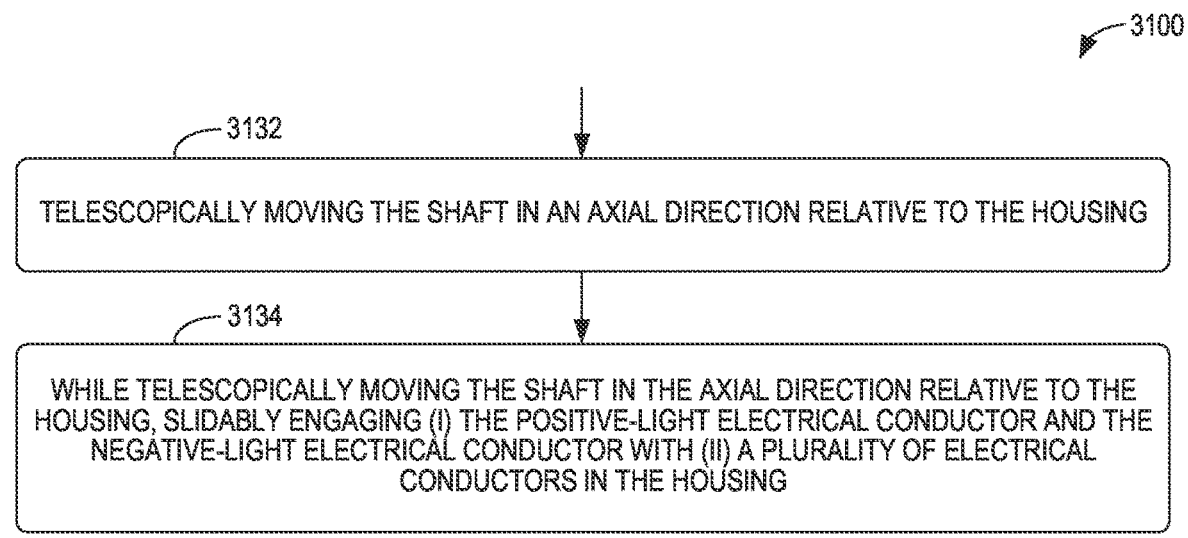
FIG. 39 illustrates a flow chart of an example process for operating an electrosurgical device that can be used with at least the process shown in FIG. 31.

As shown in FIG. 39, the process 3100 can include telescopically moving the shaft in an axial direction relative to the housing at block 3132. The smoke evacuation channel can include a positive-light electrical conductor and a negative-light electrical conductor. Also, as shown in FIG. 38, the process 3100 can include while telescopically moving the shaft in the axial direction relative to the housing at block 3132, slidably engaging (i) the positive-light electrical conductor and the negative-light electrical conductor with (ii) a plurality of electrical conductors in the housing at block 3134.

Figure 40:
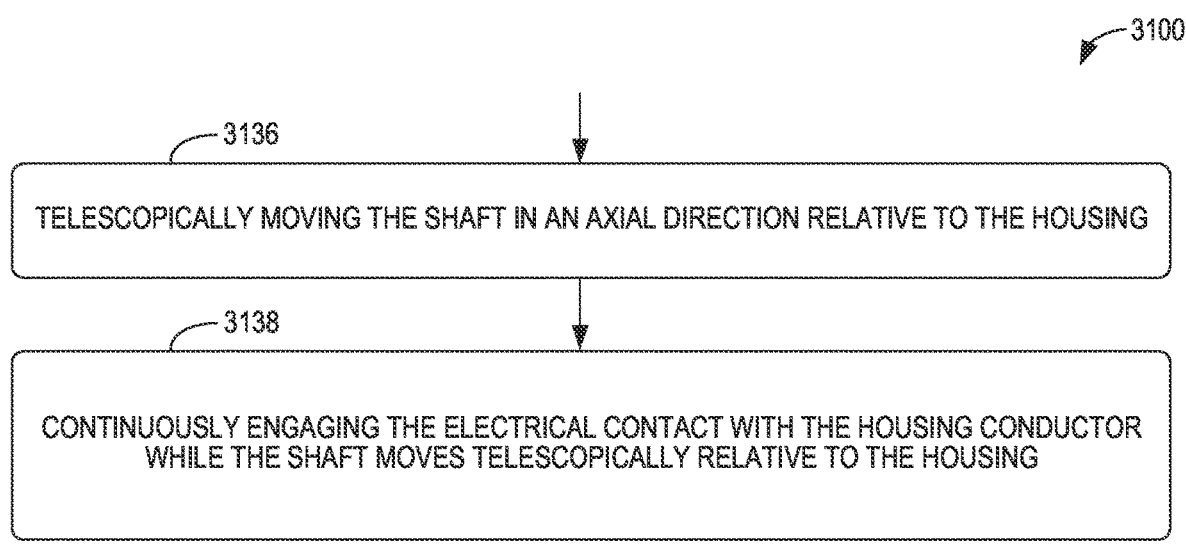
FIG. 40 illustrates a flow chart of an example process for operating an electrosurgical device that can be used with at least the process shown in FIG. 31.

As shown in FIG. 40, the process 3100 can include telescopically moving the shaft in an axial direction relative to the housing at block 3136. In FIG. 40, the shaft can include an electrical contact that engages a housing conductor that extends along the housing in a direction parallel to a longitudinal axis of the housing. Also, in FIG. 40, the process 40 can include continuously engaging the electrical contact with the housing conductor while the shaft moves telescopically relative to the housing at 3138.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

Also, it is contemplated that any optimal feature of the inventive variations described may be set forth and claimed independently, or in combination with any one or more of the features described herein. Likewise, reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present application is not to be limited by the subject specification, but rather only by the plain meaning of the claim terms employed.

What is claimed is:

1. An electrosurgical device comprising:
   a housing defining an interior bore;
   a shaft extending distally from the interior bore of the housing, wherein the shaft is rotatable relative to the housing, wherein the shaft has a longitudinal axis extending between a proximal end of the shaft and a distal end of the shaft;
   a smoke evacuation channel in an inner cavity of the shaft, wherein the smoke evacuation channel is rotationally fixed relative to the housing; and
   an electrosurgical electrode extending distally from the distal end of the shaft such that (i) the shaft conducts electrosurgical energy to the electrosurgical electrode, and (ii) rotation of the shaft relative to the housing causes corresponding rotation of the electrosurgical electrode relative to the housing.

2. The electrosurgical device of claim 1, wherein the electrosurgical electrode comprises a proximal portion extending from the distal end of the shaft, and a distal portion that comprises a working end configured to apply electrosurgical energy to tissue, and
wherein a center axis of the distal portion of the electrosurgical electrode and a center axis of the smoke evacuation channel are collinear.

3. The electrosurgical device of claim 1, wherein the smoke evacuation channel defines a space that is void of any other structure between a proximal end of the smoke evacuation channel and a distal end of the smoke evacuation channel.

4. The electrosurgical device of claim 1, wherein the electrosurgical electrode and the shaft are formed as a monolithic structure.

5. The electrosurgical device of claim 1, wherein the electrosurgical electrode and the shaft are separate components that are coupled to each other.

6. The electrosurgical device of claim 1, wherein a proximal portion of the electrosurgical electrode comprises a first leg extending from a distal end of the shaft, and a second leg extending from the distal end of the shaft.

7. The electrosurgical device of claim 6, wherein the first leg and the second leg are diametrically opposed to each other around a circumference of the distal end of the shaft.

8. The electrosurgical device of claim 7, wherein a proximal-facing surface of the proximal portion of the electrosurgical electrode tapers, along a distal direction, toward a center axis of the shaft to define a gap between the proximal-facing surface and a plane at a distalmost end of the shaft.

9. The electrosurgical device of claim 1, wherein the shaft is telescopically movable in the interior bore of the housing to adjust a distance of a distalmost tip of the electrosurgical electrode relative to the housing.

10. The electrosurgical device of claim 1, wherein the shaft and the electrosurgical electrode are rotatable by more than 360 degrees relative to the housing.

11. The electrosurgical device of claim 1, wherein at least a portion of the smoke evacuation channel has a non-circular shape to inhibit rotation of the smoke evacuation channel relative to the housing while the shaft and the electrosurgical electrode rotate relative to the housing.

12. The electrosurgical device of claim 11, wherein a proximal end of the smoke evacuation channel comprises a non-rotational fitting that is configured to engage with a correspondingly shaped structure in the housing, and
wherein the non-rotational fitting has a non-circular cross-sectional shape.

13. The electrosurgical device of claim 12, wherein the non-rotational fitting comprises a through-bore that has a cross-sectional area that is less than a cross-sectional area of a body of the smoke evacuation channel, which is proximal of the non-rotational fitting.

14. The electrosurgical device of claim 1, further comprising a light source in an inner cavity of the shaft, wherein the light source is configured to emit light in a direction toward a distal end of the shaft.

15. The electrosurgical device of claim 14, further comprising an optical lens configured to transmit the light from the light source in a distal direction and emit the light from a distal end of the shaft.

16. The electrosurgical device of claim 15, wherein the smoke evacuation channel extends through an aperture in the optical lens and an aperture in the light source.

17. The electrosurgical device of claim 14, wherein the smoke evacuation channel comprises a positive-light electrical conductor and a negative-light electrical conductor that slidably engage corresponding electrical conductors in the housing while the shaft telescopically moves in an axial direction relative to the housing.

18. The electrosurgical device of claim 14, wherein the light source has a non-circular shape to inhibit rotation of the light source relative to the housing while the shaft and the electrosurgical electrode rotate relative to the housing.

19. The electrosurgical device of claim 1, wherein a gap is defined between the shaft and the smoke evacuation channel to provide for rotation of the shaft relative to the smoke evacuation channel.

20. The electrosurgical device of claim 1, wherein the shaft comprises an electrical contact that engages a housing conductor that extends along the housing in a direction parallel to a longitudinal axis of the housing, and
wherein the electrical contact is configured to remain engaged with the housing conductor while the shaft moves telescopically relative to the housing.

* * * * *